US012658657B2

(12) United States Patent
Fang et al.

(10) Patent No.: US 12,658,657 B2
(45) Date of Patent: Jun. 16, 2026

(54) OUTLET SOCKET INCLUDING PRINTED CIRCUIT BOARD-IMPLEMENTED ANTENNA

(71) Applicant: Honeywell International Inc., Charlotte, NC (US)

(72) Inventors: Bo Fang, Tianjin (CN); Hongjie Ji, Tianjin (CN); Jiajia Xu, Tianjin (CN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 19/015,017

(22) Filed: Jan. 9, 2025

(65) Prior Publication Data

US 2025/0239823 A1 Jul. 24, 2025

(51) Int. Cl.

*H01R 25/00* (2006.01)
*H01R 13/70* (2006.01)
*H01R 31/06* (2006.01)

(52) U.S. Cl.

CPC ........... *H01R 25/006* (2013.01); *H01R 13/70* (2013.01); *H01R 31/065* (2013.01)

(58) Field of Classification Search

CPC .... H01R 25/006; H01R 13/70; H01R 31/065; H01R 25/00; H01R 31/06

See application file for complete search history.

(56) References Cited

U.S. PATENT DOCUMENTS

| | | | |
|---|---|---|---|
| 8,439,692 B1 | 5/2013 | Oddsen et al. |
| 9,437,993 B2 | 9/2016 | Stephens |
| 11,289,853 B2 | 3/2022 | Stephens |
| 2022/0352670 A1 | 11/2022 | East |
| 2023/0318222 A1 | 10/2023 | Ko |

OTHER PUBLICATIONS

Legrand Brand Photos, Prior Art Product, 1 page, Photos dated on or before Nov. 30, 2023.

*Primary Examiner* — Robert L Deberadinis

(74) *Attorney, Agent, or Firm* — Seager, Tufte & Wickhem, LLP

(57) ABSTRACT

A printed circuit board-implemented antenna may be used in a smart socket. The printed circuit board implemented-antenna includes a plurality of antenna legs arranged within a rectangular area on a printed circuit board of less than 80 square millimeters with each of the plurality of antenna legs formed using one or more metal layers of the printed circuit board, the plurality of antenna legs arranged to provide a return loss of less then −10 dB at 2.4 GHz. The printed circuit board-implemented antenna may be disposed within the smart socket in such a way as to ensure that there are no packaged electrical components in front of or behind the printed circuit board-implemented antenna.

20 Claims, 26 Drawing Sheets

Effective received power with
calibration factor and constant elevation

Effective received power with
calibration factor and constant azimuth

OUTLET SOCKET INCLUDING PRINTED CIRCUIT BOARD-IMPLEMENTED ANTENNA

The present application claims priority to PCT International Application No. PCT/CN2024/073189, filed on Jan. 19, 2024, entitled "OUTLET SOCKET INCLUDING PRINTED CIRCUIT BOARD-IMPLEMENTED ANTENNA", which is incorporated herein by reference.

TECHNICAL FIELD

The present disclosure relates generally to an outlet socket and more particularly to an outlet socket implementing an antenna such as a printed circuit board-implemented antenna.

BACKGROUND

Smart sockets are used to provide power to various components that are plugged into the smart socket. Some smart sockets are able to monitor power consumption and/or other power-related parameters of the components that are plugged into the smart socket. In some cases, smart sockets include relays that may be controlled to selectively turn power on and turn power off to the components plugged into the socket. In order to monitor the power consumption and/or other power-related parameters of the components, monitor various operating parameters of the smart socket, remotely control the relays and/or monitor and/or control other parameters or settings of the smart socket, the smart socket often include a wireless communication capability. What would be desirable is a smart socket that is arranged to better position an antenna within the smart socket housing in order to reduce potential interference caused by proximity of conductive components of the smart socket.

SUMMARY

The present disclosure relates generally to an outlet socket and more particularly to an outlet socket implementing an antenna such as a printed circuit board-implemented antenna. An example may be found in an outlet socket that includes a first socket receptacle for receiving a first power plug and a second socket receptacle for receiving a second power plug. A first relay supplies power to the first power plug when the first relay is in a closed state and does not supply power to the first power plug when the first relay is in an open state. A second relay supplies power to the second power plug when the second relay is in the closed state and does not supply power to the second power plug when the second relay is in the open state. The outlet socket includes a wireless communication circuit, an antenna operatively connected to the wireless communication circuit and a controller operatively coupled to the first relay, the second relay and the wireless communication circuit, where the controller is configured to communicate with one or more remote devices via the wireless communication circuit and the antenna and to control the state of the first relay and the second relay. The illustrative outlet socket includes a packaged electrical component free zone extending from the antenna to a front of the outlet socket and from the antenna to a back of the outlet socket, wherein the packaged component free zone is free from packaged electrical components including the first relay and the second relay. The packaged electrical component free zone helps reduce potential interference caused by packaged electrical components of the outlet socket.

Another example may be found in an outlet socket for supplying power to a removable power plug. The outlet socket includes a housing having a front and a back, with the front having a female hot port, a female neutral port and a female ground port for receiving a male hot conductor, a male neutral conductor and a male ground conductor, respectively, of the removable power plug. A hot female terminal is housed by the housing for electrically connecting to the male hot conductor when the male hot conductor is inserted through the female hot port of the housing. A neutral female terminal is housed by the housing for electrically connecting to the male neutral conductor when the male neutral conductor is inserted through the female neutral port of the housing. A ground female terminal is housed by the housing for electrically connecting to the male ground conductor when the male ground conductor is inserted through the female ground port of the housing. The outlet socket includes a line power input for connecting to a line wire, a neutral input for connecting to neutral wire, the neutral female terminal electrically connected to the neutral input, a ground input for connecting to a ground wire, the ground female terminal electrically connected to the ground input, and a conductive ground bracket electrically connected to the ground female terminal and extending laterally across the housing from a first side of the housing to a second opposing side of the housing, the conductive ground bracket including a first mounting plate on the first side of the housing and a second mounting plate on the second side of the housing for mounting the outlet socket. The outlet socket includes one or more printed circuit boards housed by the housing. The one or more printed circuit boards including a relay that electrically connects the hot female terminal to the line power input when the relay is in a closed state and electrically disconnects the hot female terminal from the line power input when the relay is in an open state. The one or more printed circuit boards including a wireless communication circuit and an antenna operative connected to the wireless communication circuit. The antenna is laterally offset from the conductive ground bracket. The one or more printed circuit boards including a controller that is operatively coupled to the relay and the wireless communication circuit, and is configured to communicate with one or more remote devices via the wireless communication circuit and the antenna, and to control the state of the relay. The outlet socket includes a packaged electrical component free zone extending from the antenna to the front of the housing and from the antenna to the back of the housing, wherein the packaged component free zone is free from packaged electrical components. The packaged component free zone helps reduce potential interference caused by packaged electrical components of the outlet socket.

Another example may be found in an outlet socket for supplying power to a removable power plug. The outlet socket includes a housing having a front and a back, with the front having a female hot port, a female neutral port and a female ground port for receiving a male hot conductor, a male neutral conductor and a male ground conductor, respectively, of the removable power plug. A hot female terminal is housed by the housing for electrically connecting to the male hot conductor when the male hot conductor is inserted through the female hot port of the housing. A neutral female terminal is housed by the housing for electrically connecting to the male neutral conductor when the male neutral conductor is inserted through the female neutral port of the housing. A ground female terminal housed by the housing for electrically connecting to the male ground conductor when the male ground conductor is inserted through the female ground port of the housing. The outlet socket includes a line power input for connecting to a line wire, a neutral input for connecting to neutral wire, the neutral female terminal electrically connected to the neutral input, a ground input for connecting to a ground wire, the ground female terminal electrically connected to the ground input, and a conductive ground bracket electrically connected to the ground female terminal and extending laterally across the housing from a first side of the housing to a second opposing side of the housing, the conductive ground bracket including a first mounting plate on the first side of the housing and a second mounting plate on the second side of the housing for mounting the outlet socket. The outlet socket includes one or more printed circuit boards housed by the housing. The one or more printed circuit boards including a relay that electrically connects the hot female terminal to the line power input when the relay is in a closed state and electrically disconnects the hot female terminal from the line power input when the relay is in an open state. The one or more printed circuit boards including a wireless communication circuit, a printed circuit board implemented antenna operative connected to the wireless communication circuit, wherein the printed circuit board implemented antenna includes one or more conductive traces of one of the one or more printed circuit boards. The printed circuit board implemented antenna is laterally offset from the conductive ground bracket. The one or more printed circuit boards including a controller operatively coupled to the relay and the wireless communication circuit, and configured to communicate with one or more remote devices via the wireless communication circuit and the printed circuit board implemented antenna, and to control the state of the relay. The outlet socket includes a conductive component free zone extending from the printed circuit board implemented antenna to the front of the housing and from the printed circuit board implemented antenna to the back of the housing, wherein the conductive component free zone is free from conductive components that would interfere with the range of the printed circuit board implemented antenna in one or more directions. The conductive component free zone helps reduce potential interference caused by conductive components of the outlet socket.

BRIEF DESCRIPTION OF THE FIGURES

The disclosure may be more completely understood in consideration of the following description of various examples in connection with the accompanying drawings, in which.

Figure 1:
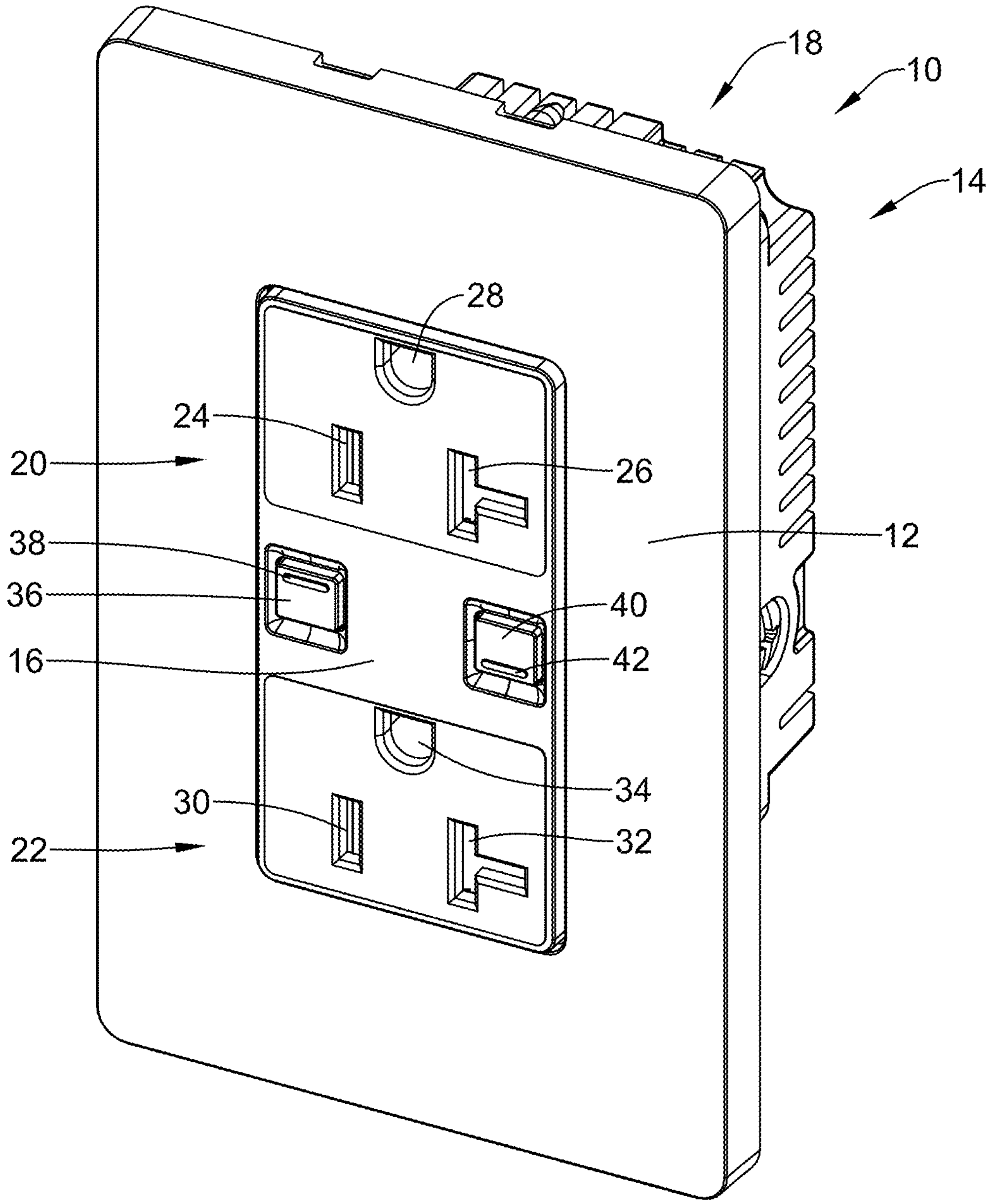
FIG. 1 is a perspective view of an illustrative outlet socket including one or more trim plates and having a first socket receptacle style.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term “about”, unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms “a”, “an”, and “the” include the plural referents unless the content clearly dictates otherwise. As used in this specification and the appended claims, the term “or” is generally employed in its sense including “and/of” unless the content clearly dictates otherwise.

It is noted that references in the specification to “an embodiment”, “some embodiments”, “other embodiments”, etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a perspective view of an illustrative outlet socket 10 shown with a trim plate 12. In some cases, there may be one or more additional trim plates (not shown) underneath the trim plate 12. The outlet socket 10 has a housing 14 that includes a housing front 16 and a housing back 18. The outlet socket 10 includes a first outlet receptacle 20 and a second outlet receptacle 22. The first outlet receptacle 20 includes a first female hot port 24, a first female neutral port 26 and a first female ground port 28 that together are configured to accommodate a male plug (not shown) including a male hot conductor, a male neutral conductor, and a male ground connector, respectively. The first female hot port 24, the first female neutral port 26 and the first female ground port 28 may be considered as extending through the housing front 16. The second outlet receptacle 22 includes a second female hot port 30, a second female neutral port 32 and a second female ground port 34 that together are configured to accommodate a male plug (not shown) including a male hot conductor, a male neutral conductor, and a male ground connector, respectively. The second female hot port 30, the second female neutral port 32 and the second female ground port 34 may be considered as extending through the housing front 16.

The outlet socket 10 may be installed into a junction box in the illustrated orientation, in which the first female ground port 28 is atop the first outlet receptacle 20 and the second female ground port 34 is atop the second outlet receptacle 22. In some instances, the outlet socket 10 may be installed into a junction box in a reversed illustrated orientation, in which the first female ground port 28 is at the bottom of the first outlet receptacle 20 and the second female ground port 34 is at the bottom of the second outlet receptacle 22. This assumes a vertically oriented junction box.

The outlet socket 10 may be configured to be connected to a variety of different electrical power circuits. For example, the outlet socket 10 may be configured to be electrically coupled with a 10 ampere (10 A) electrical power circuit. The outlet socket 10 may be configured to be electrically coupled with a 15 ampere (15 A) electrical power circuit. As shown, the outlet socket 10 is configured to be electrically coupled with a 20 ampere (20 A) circuit. As shown, the first female neutral port 26 and the second female neutral port 32 are made to accommodate not only a flat bladed male neutral conductor (not shown), but also to accommodate a male neutral conductor that has an orthogonal orientation (such as a straight blade angle plug). In some instances, the outlet socket 10 may be considered as being a smart socket. This means that the outlet socket 10 may be configured to communicate with a remote device (e.g. remove server) that is able to monitor electrical consumption by the outlet socket 10, monitor internal temperature within the outlet socket 10 in order to detect possible overheating scenarios before a fire results, and/or remotely turn the first outlet receptacle 20 and/or the second outlet receptacle 22 on and off. These are just examples.

In some instances, the outlet socket 10 may include a first button 36 that a user may use to manually turn the first outlet receptacle 20 on or off. The first button 36 may include a first LED indicator 38 that provides an indication of the status of the first outlet receptacle 20. For example, the first LED indicator 38 may be on when the first outlet receptacle 20 is powered and the first LED indicator 38 may be off when the first outlet receptacle 20 is not powered. In some instances, the first LED indicator 38 may be any of a variety of different colors. For example, the first LED indicator 38 may glow green to indicate that the first outlet receptacle 20 is powered, and may glow red to indicate a potential problem. In some instances, as will be discussed, the first LED indicator 38 may simply be an aperture formed within the first button 36 that allows light from an LED below the first button 36 to shine through.

In some instances, the outlet socket 10 may include a second button 40 that a user may use to manually turn the second outlet receptacle 22 on or off. The second button 40 may include a second LED indicator 42 that provides an indication of the status of the second outlet receptacle 22. For example, the second LED indicator 42 may be on when the second outlet receptacle 22 is powered and the second LED indicator 42 may be off when the second outlet receptacle 22 is not powered. In some instances, the second LED indicator 42 may be any of a variety of different colors. For example, the second LED indicator 42 may glow green to indicate that the second outlet receptacle 22 is powered, and may glow red to indicate a potential problem. In some instances, as will be discussed, the second LED indicator 42 may simply be an aperture formed within the second button 40 that allows light from an LED below the second button 40 to shine through.

Figure 2:
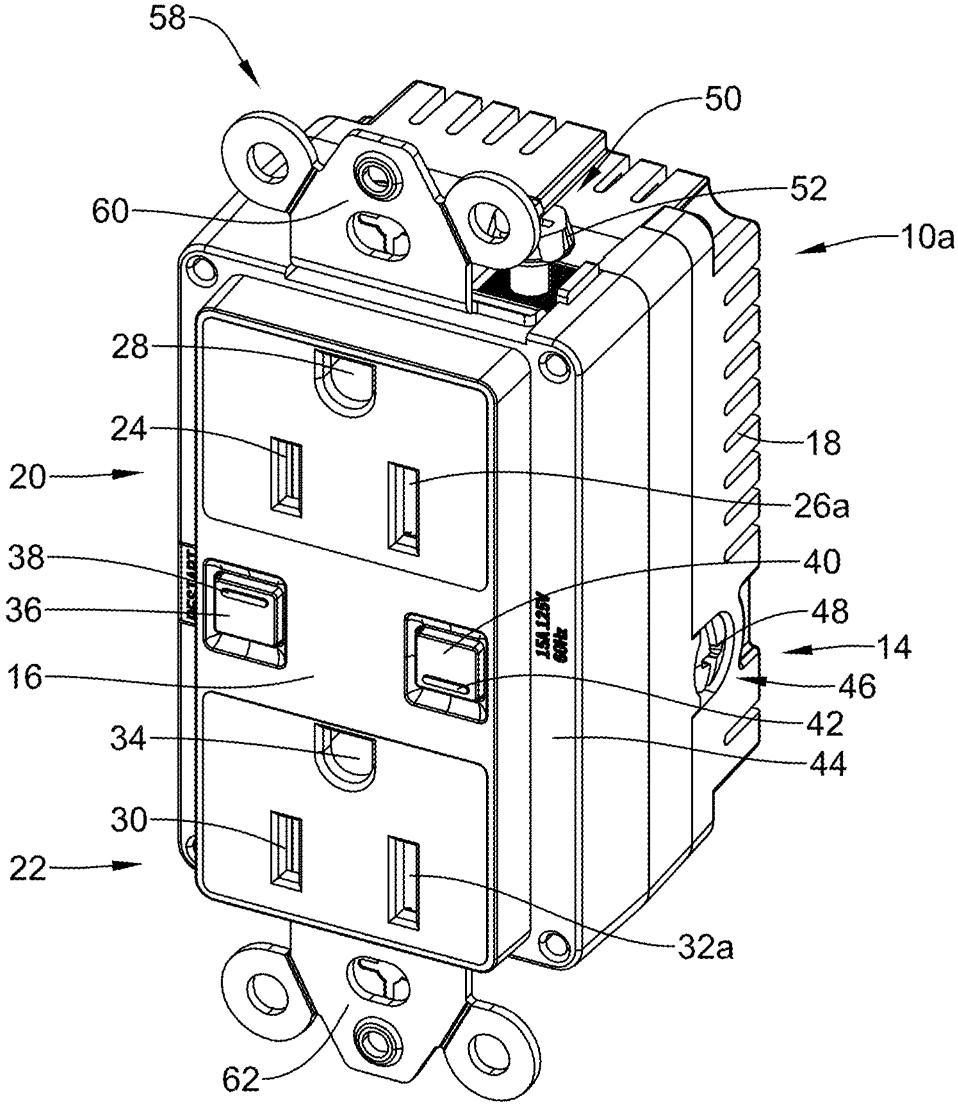
FIG. 2 is a first perspective view of an illustrative outlet socket having a second socket receptacle style.
Figure 3:
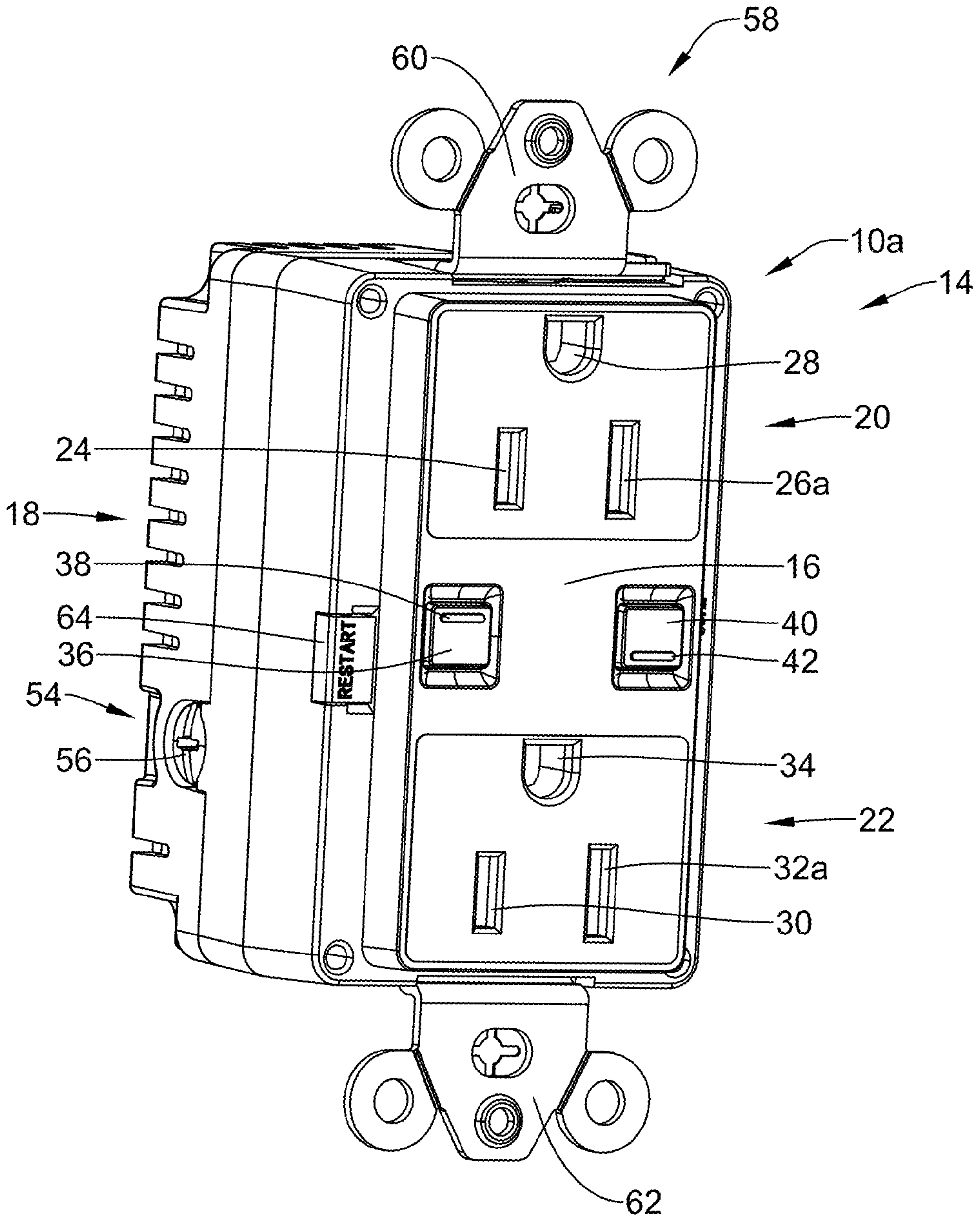
FIG. 3 is a second perspective view of the illustrative outlet socket of FIG. 2.

FIG. 2 is a first perspective view and FIG. 3 is a second perspective view of an outlet socket 10*a* that is similar to the outlet socket 10 shown in FIG. 1, but is an example of an outlet socket that is configured for a lower power rating such as a 10 ampere circuit or a 15 ampere circuit. As shown, the housing front 16 includes the first outlet receptacle 20 and the second outlet receptacle 22. One distinction over that shown in FIG. 1 is that the first neutral port 26*a* of the first outlet receptacle 20 and the second neutral port 32*a* of the second outlet receptacle 22 are designed to accommodate a first male neutral conductor component but not the corresponding orthogonally arranged second male neutral conductor component. This may signifies that the outlet socket 10*a* is designed for a lower power circuit. In particular, the housing front 16 includes a stamping or printing 44 indicating that the outlet socket 10*a* is designed for use in a 120 volt, 15 ampere circuit.

Also visible in FIG. 2 is a neutral input 46 including a screw 48 that may be used to secure a neutral power line to the neutral input 46. A ground input 50 includes a screw 52 that may be used to secure a ground power line to the ground input 50. As shown in FIG. 3, the outlet socket 10*a* includes a hot input 54 with a screw 56 that may be used to secure a hot power line to the hot input 54. The neutral input 46, the ground input 50 and the hot input 54 allow the outlet socket 10*a* to be electrically connected within a 120 volt (for example) circuit. The outlet socket 10*a* includes a ground bracket 58 with a first mounting tab 60 and a second mounting tab 62. The first mounting tab 60 and the second mounting tab 62 may be used to physically secure the outlet socket 10*a* in position within a junction box. As will be discussed and shown in subsequent drawings, the ground bracket 58 electrically connects together the ground terminals that are positioned behind the first female ground port 28 and the second female ground port 34. In some instances, the outlet socket 10*a* may include a reset button 64 that may be actuated in order to instruct the outlet socket 10*a* to reset itself (e.g. reset the controller of the outlet socket), much like resetting a small microcontroller, for example.

Figure 4:
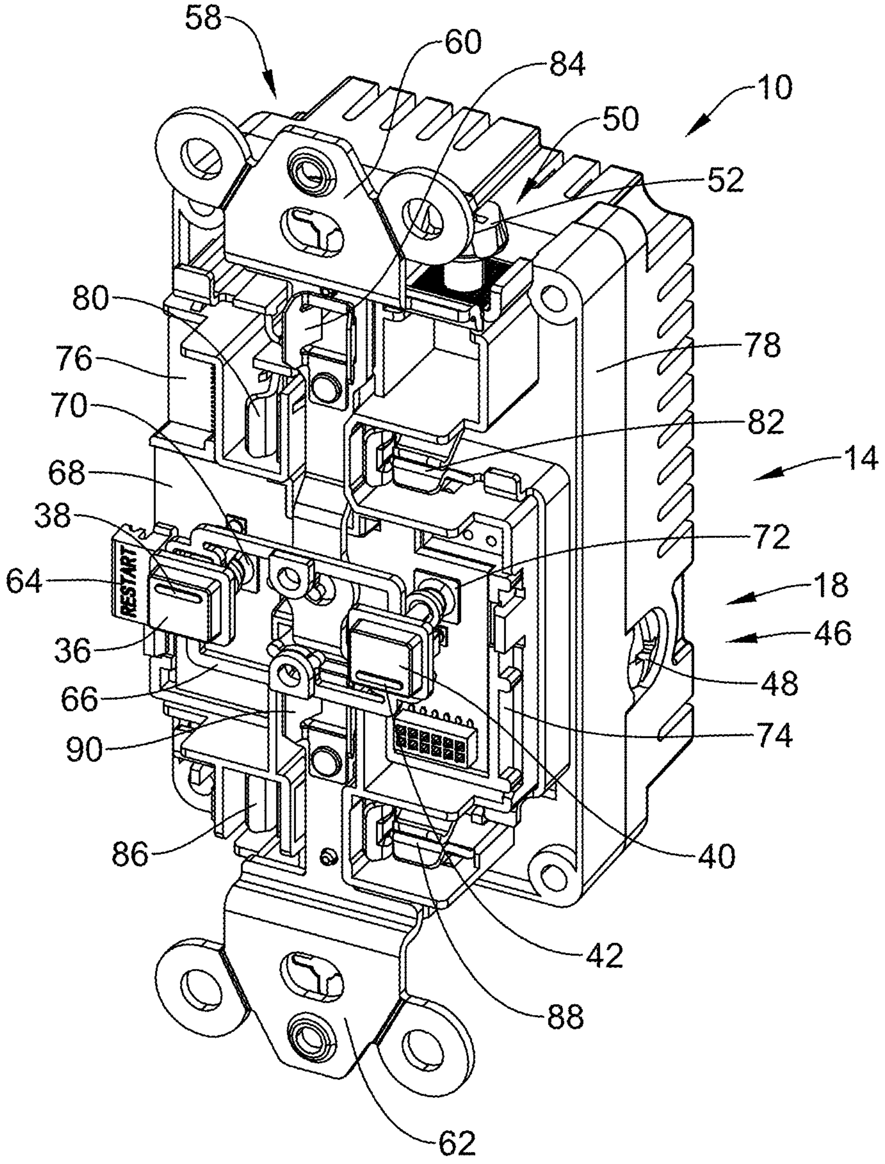
FIG. 4 is a perspective view of an illustrative outlet socket with some components removed to show internal components.

FIG. 4 shows the outlet socket 10 (or 10*a*) with the housing front 16 removed, revealing additional details regarding the outlet socket 10. The outlet socket 10 includes a resilient ring 66 that supports the first button 36 (with first LED indicator 38) and the second button 40 (with the second LED indicator 42). A user interface PCB 68 is disposed behind the resilient ring 66, and includes a first switch 70 that is actuated by depressing the first button 36 and a second switch 72 that is actuated by depressing the second button 40. A first spacer 74 is disposed behind the user interface PCB 68. A communication PCB 76 is disposed behind the first spacer 74. A second spacer 78 is disposed behind the communication PCB 76. The second spacer 78 defines a number of recesses that house the female terminals making up part of the first outlet receptacle 20 and the second outlet receptacle 22.

The first outlet receptacle 20 includes a first female hot terminal 80 that is aligned with the first female hot port 24, a first female neutral terminal 82 that is aligned with the first female neutral port 26, and a first female ground terminal 84 that is aligned with the first female ground port 28. The male hot conductor of a male plug (not shown) can extend through the first female hot port 24 and into the first female hot terminal 80 and make electrical connection therewith, the male neutral conductor of the male plug can extend through the first female neutral port 26 and into the first female neutral terminal 82 and make electrical connection therewith, and the male ground conductor of the male plug can extend through the first female ground port 28 and make electrical connection therewith. Similarly, the second outlet receptacle 22 includes a second female hot terminal 86 that is aligned with the second female hot port 30, a second female neutral terminal 88 that is aligned with the second female neutral port 32, and a second female ground terminal 90 that is aligned with the second female ground port 34. The male hot conductor of a male plug (not shown) can extend through the second female hot port 30 and into the second female hot terminal 86 and make electrical connection therewith, the male neutral conductor of the male plug can extend through the second female neutral port 32 and into the second female neutral terminal 88 and make electrical connection therewith, and the male ground conductor of the male plug can extend through the second female ground port 34 and make electrical connection therewith.

Figure 5:
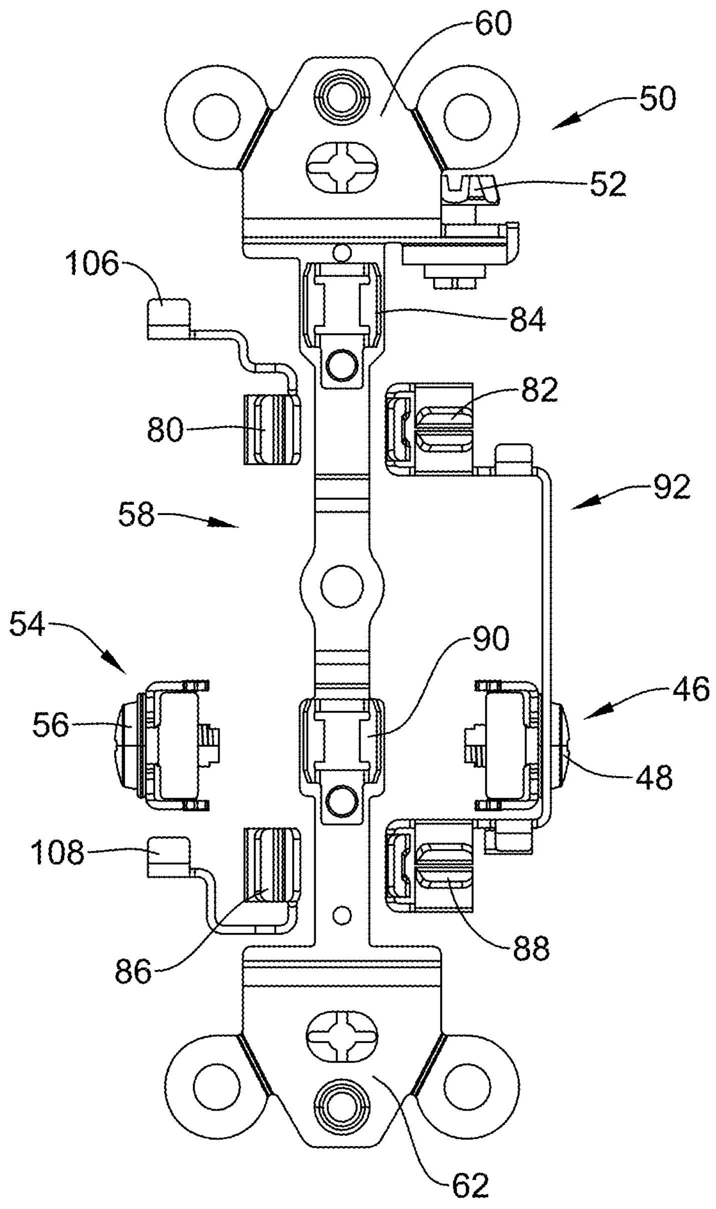
FIG. 5 is a front view of the line voltage components of the illustrative outlet socket of FIG. 4.

FIG. 5 provides a view of the line voltage components of the outlet socket 10, with each of the line voltage components spatially oriented with respect to each other in the same three dimensional positions they occupy within the outlet socket 10. While not shown in FIG. 5, the relays that selectively connect and disconnect the female hot terminals 80 and 86 with line voltage (as provided by the hot input 54) may also be considered as being line voltage components.

Figure 5A:
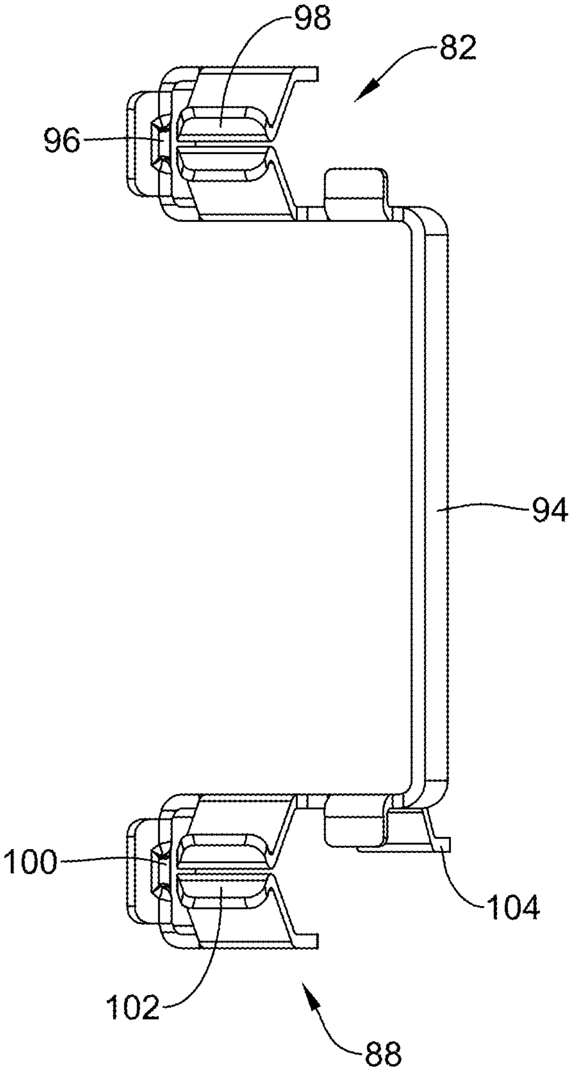
FIG. 5A is a perspective view of a neutral conductive component that is one of the line voltage components shown in FIG. 5.

FIG. 5A is a perspective view of an illustrative neutral conductive component 92 that includes the first female neutral terminal 82 and the second female neutral terminal 88. A conductive member 94 extends between the first female neutral terminal 82 and the second female neutral terminal 88, and electrically couples the first female neutral terminal 82 with the second female neutral terminal 88. In some instances, the neutral conductive component 92 is integrally formed from a single piece of metal (such as copper or brass). As noted, the outlet socket 10 (and 10*a*) may be configured to be used with a variety of different power capacity circuits, and thus the first female neutral terminal 82 and the second female neutral terminal 88 may each be configured to accommodate a male neutral conductor that includes a first male neutral conductor component and a second male neutral conductor component that is orthogonal to the first male neutral conductor component.

The first female neutral terminal 82 includes a segment 96 and a segment 98. A male neutral conductor having a single blade may be accommodated between the segment 96 and the segment 98. A male neutral conductor that has the orthogonal orientation may be accommodated within the segment 98. Similarly, the second female neutral terminal 88 includes a segment 100 and a segment 102. A male neutral conductor having a single blade may be accommodated between the segment 100 and the segment 102. A male neutral conductor that has the orthogonal orientation may be accommodated within the segment 102. The neutral conductive component 92 may include an extension 104 that serves to electrically couple the neutral conductive component 92 with the neutral input 46.

The first female hot terminal 80 (see FIG. 5) is part of a stamped piece of metal that includes a pad 106 that serves to electrically couple the first female hot terminal 80 with a relay (to be discussed) that selectively provides power to the first female hot terminal 80. Similarly, the second female hot terminal 86 is part of a stamped piece of metal that includes a pad 108 serves to electrically couple the second female hot terminal 86 with a relay (to be discussed) that selectively provides power to the second female hot terminal 86. The ground bracket 58 defines the first female ground terminal 84 and the second female ground terminal 90 and electrically couples the first female ground terminal 84, the second female ground terminal 90 and the mounting tabs 60 and 62.

Figure 6:
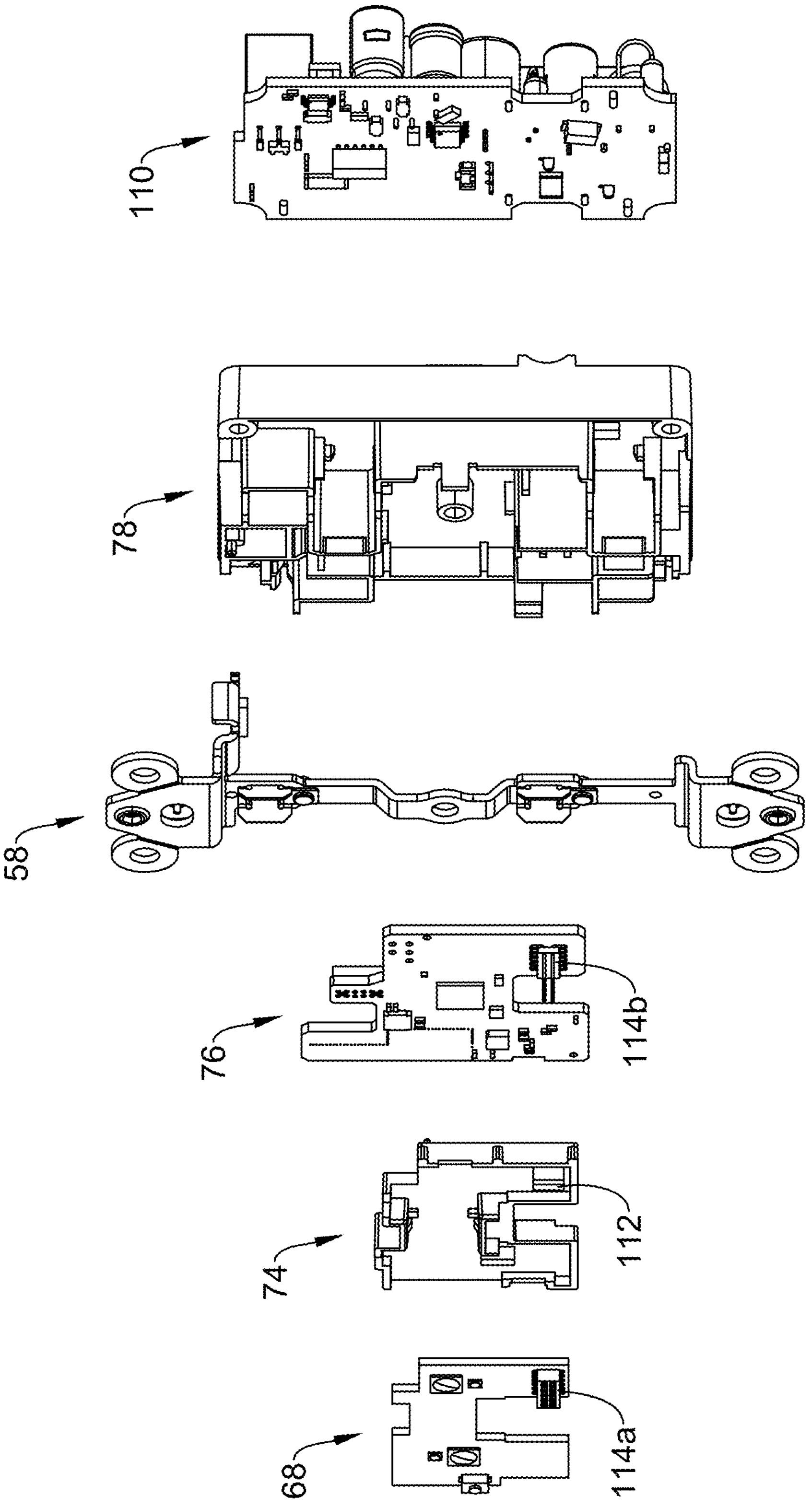
FIG. 6 is an exploded perspective view of some of the components of the illustrative outlet socket of FIG. 4.
Figure 7A:
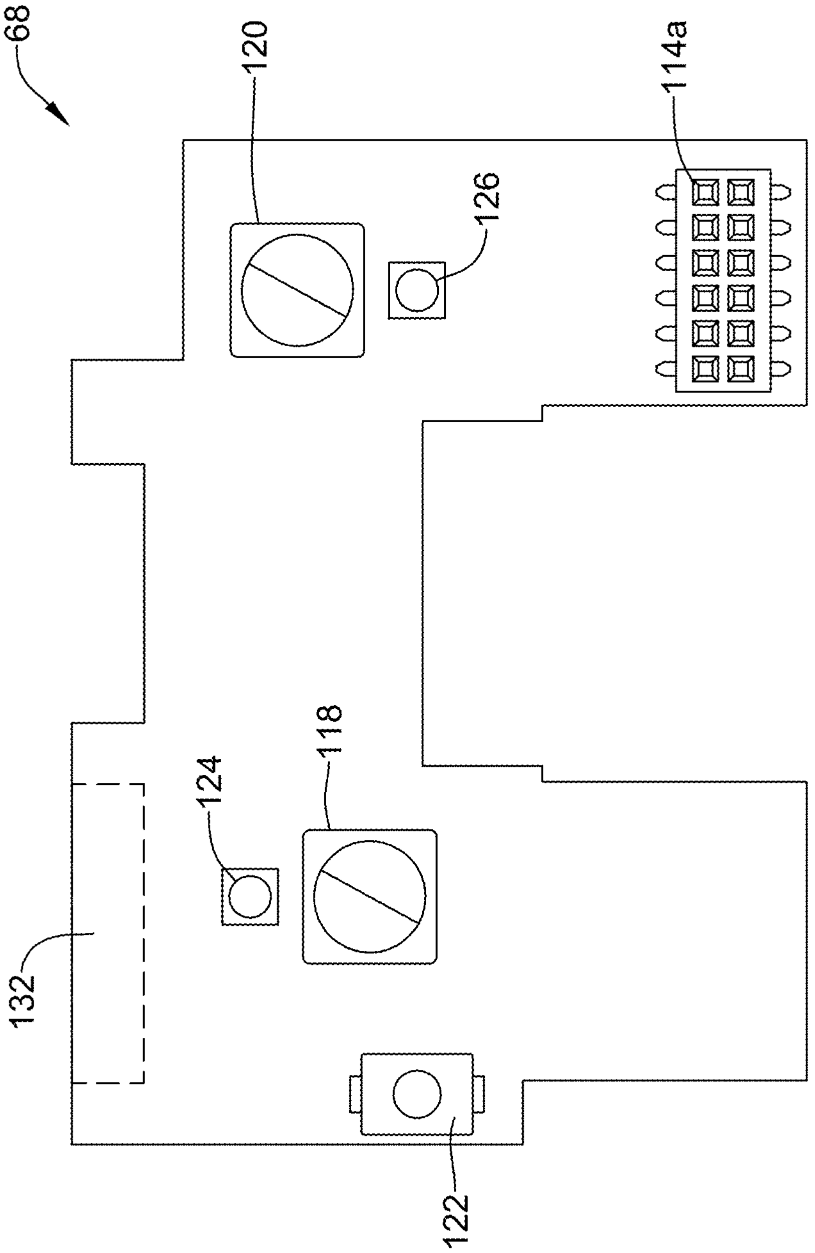
FIG. 7A is a front view and FIG. 7B is a back view of an illustrative user interface printed circuit board (PCB) forming part of the illustrative outlet socket of FIG. 4.
Figure 7B:
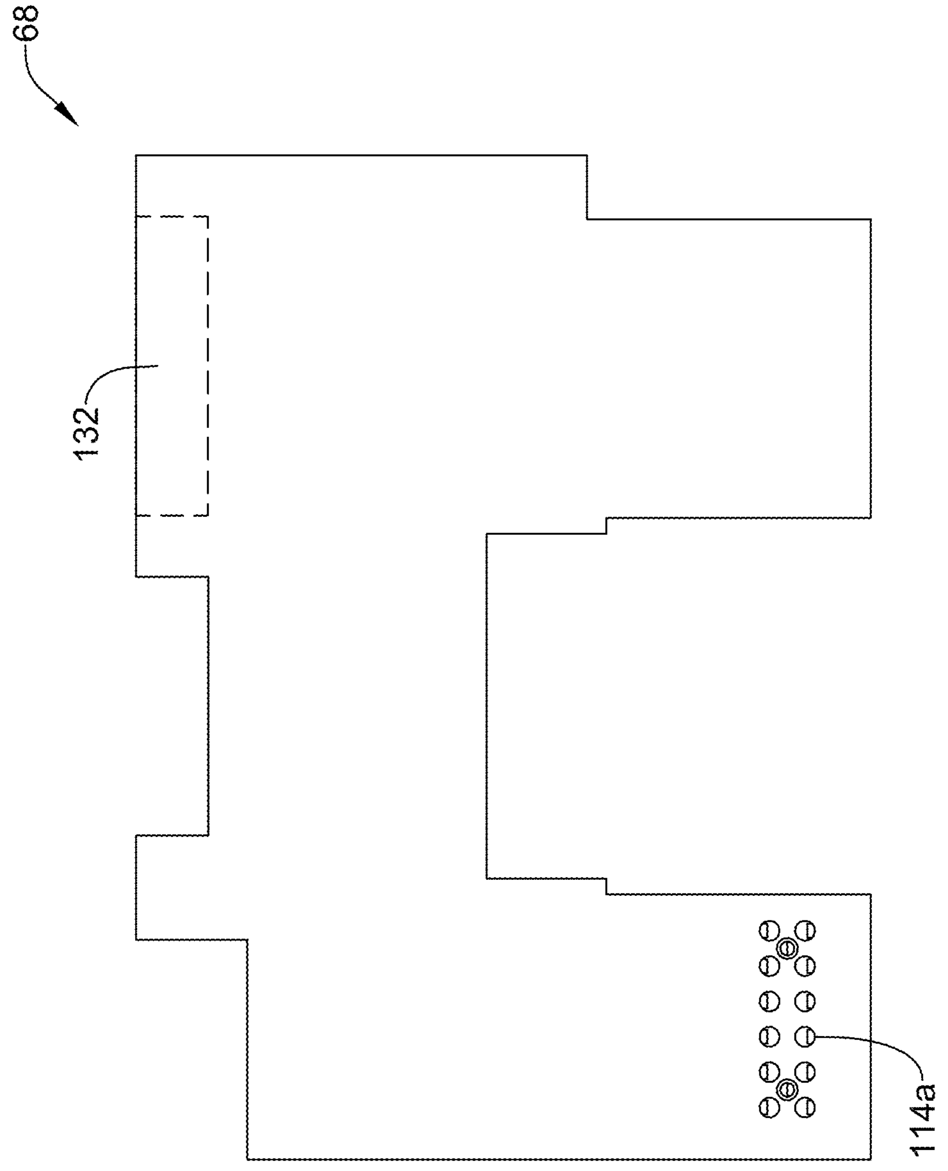
Figure 8:
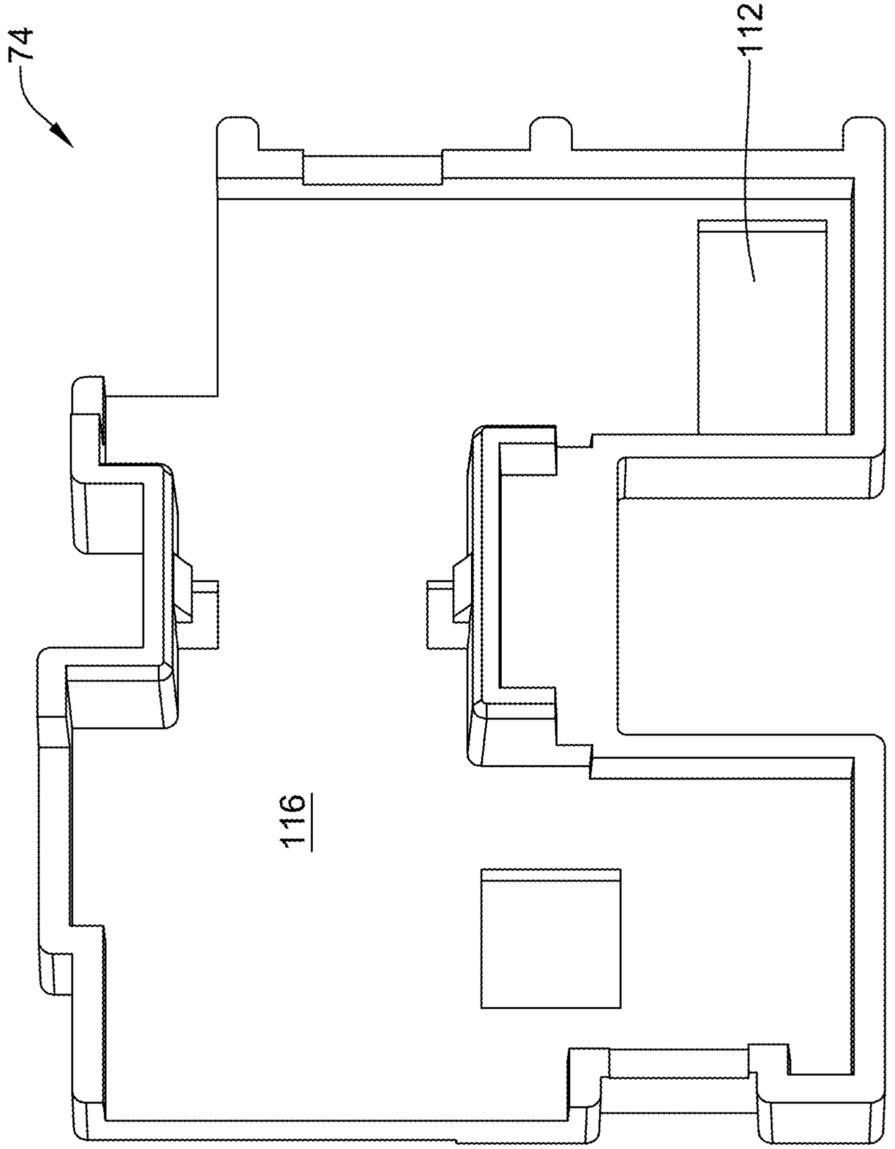
FIG. 8 is a perspective view of the front of an illustrative first spacer that is configured to be disposed behind the illustrative user interface PCB of FIGS. 7A and 7B.
Figure 9A:
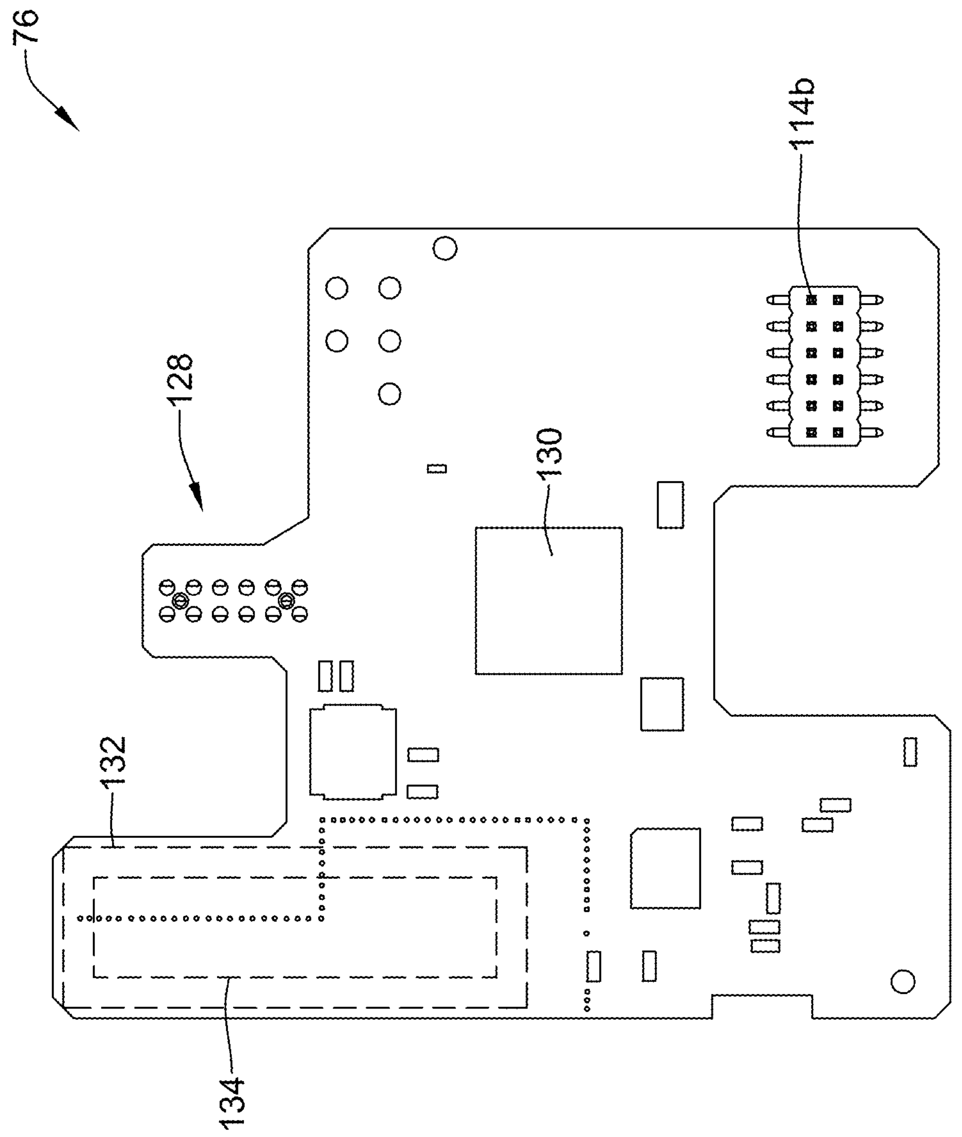
FIG. 9A is a front view and FIG. 9B is a back view of an illustrative communication PCB forming part of the illustrative outlet socket of FIG. 4.
Figure 9B:
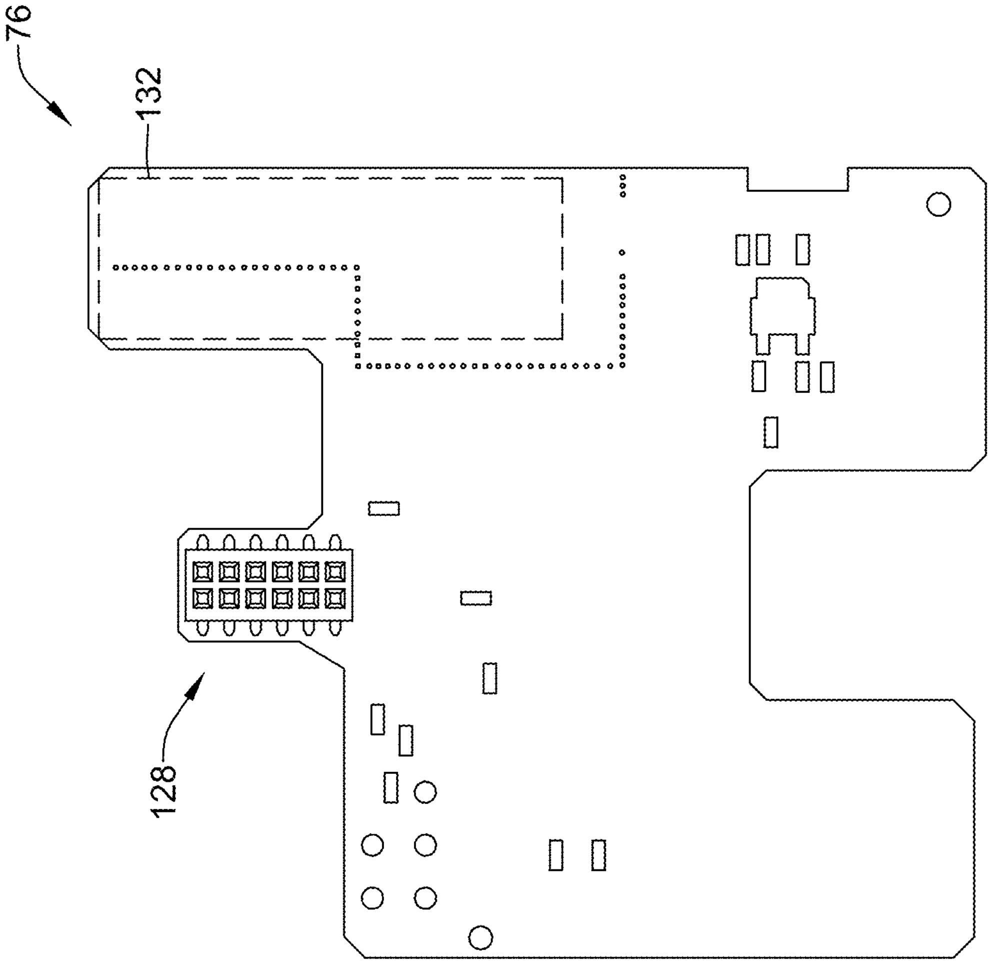
Figure 10:
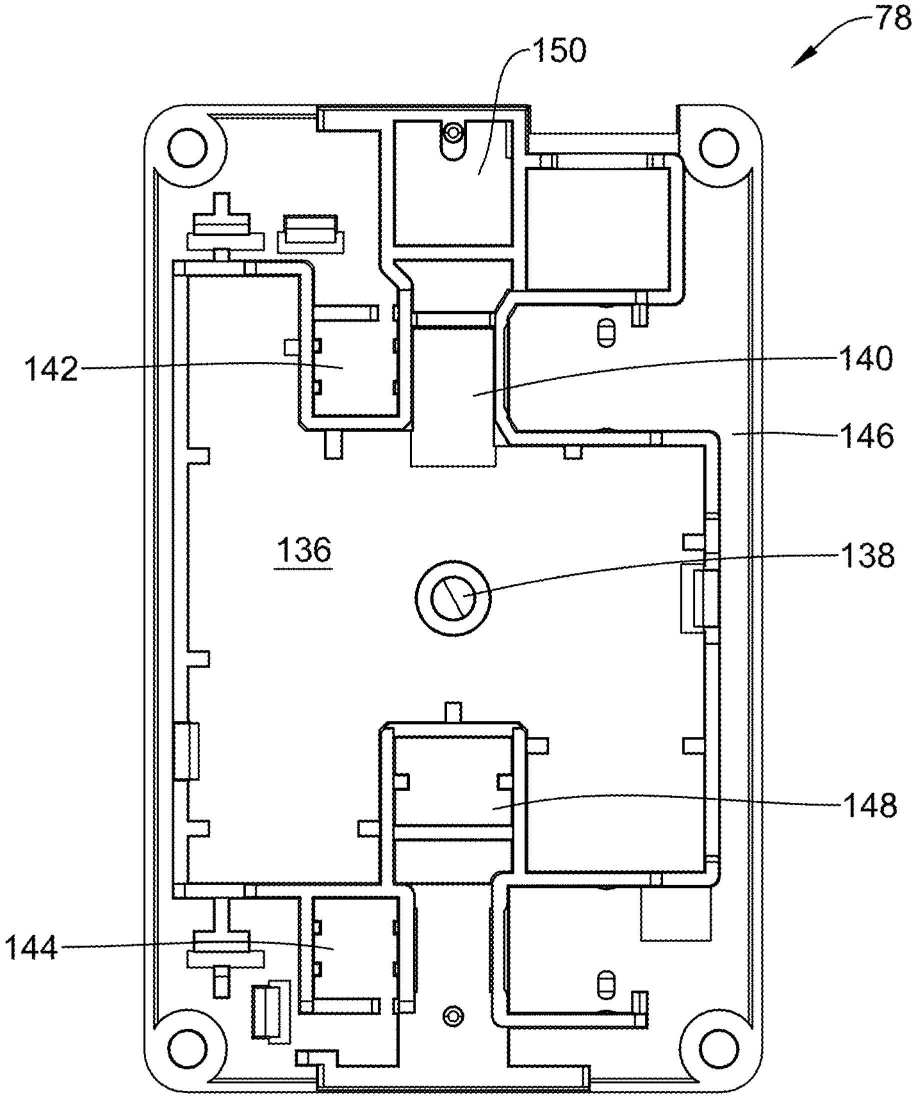
FIG. 10 is a front view of the front of an illustrative second spacer that is configured to be disposed behind the illustrative communication PCB of FIGS. 9A and 9B.
Figure 11A:
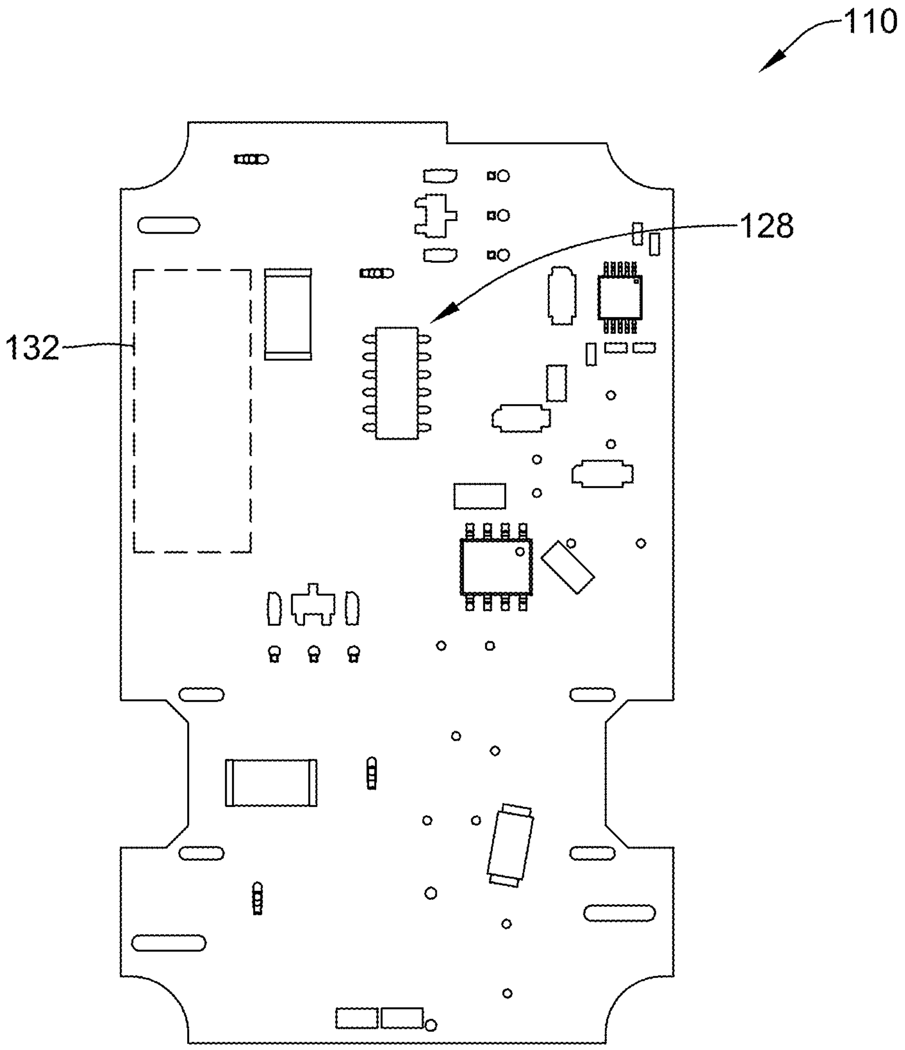
FIG. 11A is a front view and FIG. 11B is a back view of an illustrative power switching PCB forming part of the illustrative outlet socket of FIG. 4.
Figure 11B:
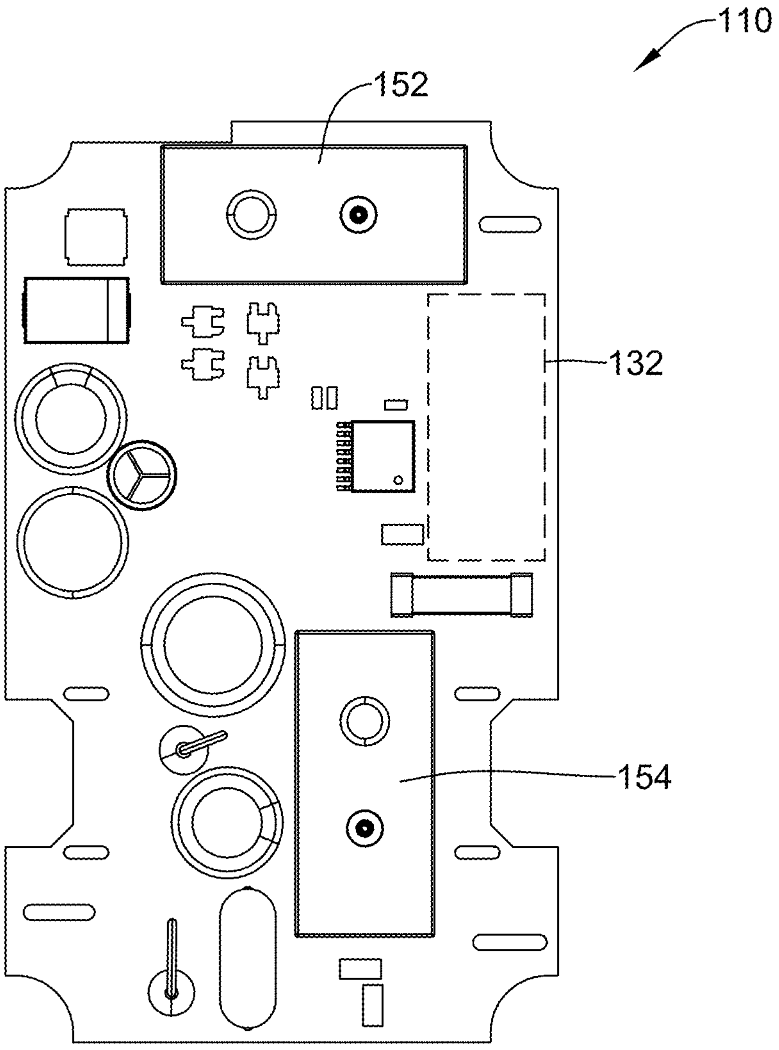

FIG. 6 is an exploded view showing some of the internal components of the outlet socket 10 (and 10*a*), including the previously noted user interface PCB 68, the first spacer 74, the communication PCB 76, the ground bracket 58 and the second spacer 78. FIG. 6 also shows a power switching PCB 110 that will be discussed in greater detail. FIGS. 7A and 7B are front and back views, respectively, of the user interface PCB 68. FIG. 8 is a perspective view of the first spacer 74 that sits behind the user interface PCB 68. FIGS. 9A and 9B are front and back views, respectively, of the communication PCB 76. FIG. 10 is a front view of the second spacer 78. FIGS. 11A and 11B are front and back views (relative to the front housing 16), respectively, of the power switching PCB 110.

The first spacer 74 includes an opening 112 that accommodates a first connector 114 that operatively couples the user interface PCB 68 with the communication PCB 76. As shown, the first connector 114 may be considered as including a female component 114*a* that is mounted to the user interface PCB 68 and a male component 114*b* that is mounted to the communication PCB 76. The first spacer 74 includes a recessed region 116 that is dimensioned to accommodate the user interface PCB 68 within the recessed region 116. The first spacer 74 may be formed of an electrically insulating material (i.e., not electrically conductive) and the first spacer 74 may not itself include any electrical or even electrically conductive components.

The user interface PCB 68 includes a first switch 118 that is actuatable by depressing the first button 36 and a second switch 120 that is actuatable by depressing the second button 40 (see FIG. 7A). The user interface PCB 68 includes a reset switch 122 that is actuatable by depressing the reset button 64. In some instances, the user interface PCB 68 includes a first LED 124 that may provide illumination for the first LED indicator 38 and a second LED 126 that may provide illumination for the second LED indicator 42. The first LED 124 and the second LED 126 may each be configured to output light of a single color. The first LED 124 and the second LED 126 may each include multiple LEDs, with each of the multiple LEDs configured to output light of a unique single color. In some cases, the first LED 124 and the second LED 126 may each be configured to output light in multiple colors, with each of the multiple colors selectable by a circuit driving the respective first LED 124 and second LED 126, for example.

The communication PCB 76 includes the male component 114*b* of the first connector 114 that operably couples the user interface PCB 68 with the communication PCB 76. The communication PCB 76 also includes a second connector 128 (see FIG. 9B) that operably couples the communication PCB 76 with the power switching PCB 110. As a result, electrical signals are able to pass between each of the user interface PCB 68, the communication PCB 76 and the power switching PCB 110. The communication PCB 76 includes a microcontroller 130 (see FIG. 9A). In some instances, the microcontroller 130 may be configured to control operation of the relays that selectively provide electrical power to the first female hot port 24 and the second female hot port 30. The microcontroller 130 may also regulate operation of the outlet socket 10 (and 10*a*) by monitoring an internal temperature of the outlet socket 10 (and 10*a*). The microcontroller 130 may also generally control most aspects of the smart outlet including the user interface PCB 68, wireless communication with a remote device and other functionality.

The communication PCB 76 includes a region 132 that does not include (i.e., is free of) any electrically conductive components and/or packaged electrical components. In some instances, as will be discussed, this region 132 (in three dimensions) may extended (project) in a first direction from the communication PCB 76 to the housing front 16 and may be extended (project) in an opposing second direction from the communication PCB 76 to the housing back 18 to define a three dimensional zone that is free of any electrically conductive components and/or packaged electrical components, other than an antenna 134. In some instances, the region 132 may be considered as being a packaged electrical component-free zone, meaning that the region 132 (and the space in front of the region 132 and the space behind the region 132) is free of any packaged electrical components. Examples of packaged electrical components include resistors, capacitors, inductors, relays, transistors and microcontrollers. In some instances, the communication PCB 76 includes an antenna 134 that is formed on the communication PCB 76 within the region 132. As an example, the region 132 may extend at least one (1) millimeter beyond a periphery of the antenna 134. The region 132 may overlap onto a portion of the user interface PCB 68.

FIG. 10 is a front view of the second spacer 78. The second spacer 78 may be formed of an electrically insulating material (i.e., not electrically conductive) and the second spacer 78 may not itself include any electrical or even electrically conductive components. The second spacer 78 includes a recessed area 136 that is dimensioned to accommodate the communication PCB 76 within the recessed area 136. In some instances, the recessed area 136 may include a stand-off 138 that holds the communication PCB 76 a short distance above a floor of the recessed area 136. In some instances, the second spacer 78 includes a recess 140 to accommodate the second connector 128 that operably couples the communication PCB 76 with the power switching PCB 110. The second spacer 78 also include walled areas that accommodate some of the line voltage components. A walled area 142 accommodates the first female hot terminal 80 while a walled area 144 accommodates the second female hot terminal 86. A walled area 146 accommodates the neutral conductive component 92, including the first female neutral terminal 82, the second female neutral terminal 88, and the conductive member 94 extending therebetween. A walled area 148 accommodates the second female ground terminal 90 while a walled area 150 accommodates the first female ground terminal 84, where the first female ground terminal 84 and the second female ground terminal 90 are part of the ground bracket 58. The ground bracket 58 is configured to extend between the first female ground terminal 84 and the second female ground terminal 90, and extends along a midline of the second spacer 78. Accordingly, the ground bracket 58 does not intrude on a zone created by extending the region 132 frontwards or backwards from the antenna 134.

The region 132 is also shown with respect to the power switching PCB 110 (FIG. 11A). As can be seen in the front view (actually the back of the power switching PCB 110) in FIG. 11A and the back view (actually the front of the power switching PCB 110) in FIG. 11B, there are no packaged electrical components (or ground plane) in the region 132 on either the front or back of the power switching PCB 110. The power switching PCB 110 includes a variety of electrical components, but none of them are disposed within the region 132. The power switching PCB 110 includes a first relay 152 that selectively provides (or does not provide) electrical power to the first female hot terminal 80 and a second relay 154 that selectively provides (or does not provide) electrical power to the second female hot terminal 86. In some cases, the first relay 152 supplies power to a first power plug (via the first outlet receptacle 20) when the first relay 152 is in a closed state and does not supply power to the first power plug (via the first outlet receptacle 20) when the first relay 152 is in an open state. In some cases, the second relay 154 supplies power to a second power plug (via the second outlet receptacle 22) when the second relay 154 is in a closed state and does not supply power to the second power plug (via the second outlet receptacle 22) when the second relay 154 is in an open state.

As can be seen, neither the first relay 152 nor the second relay 154 intrude into the region 132. Accordingly, the region 132, when extended (projected) to the front of the outlet socket 10 (or 10*a*) and to the back of the outlet socket 10 (or 10*a*) is free of packaged electrical components. In some instances, a portion of the user interface PCB 68 extends into the zone created by extending the region 132 frontwards and backwards, but that portion of the user interface PCB 68 (as seen in FIGS. 7A and 7B) does not include any packaged electrical components (or ground plane).

Figure 12A:
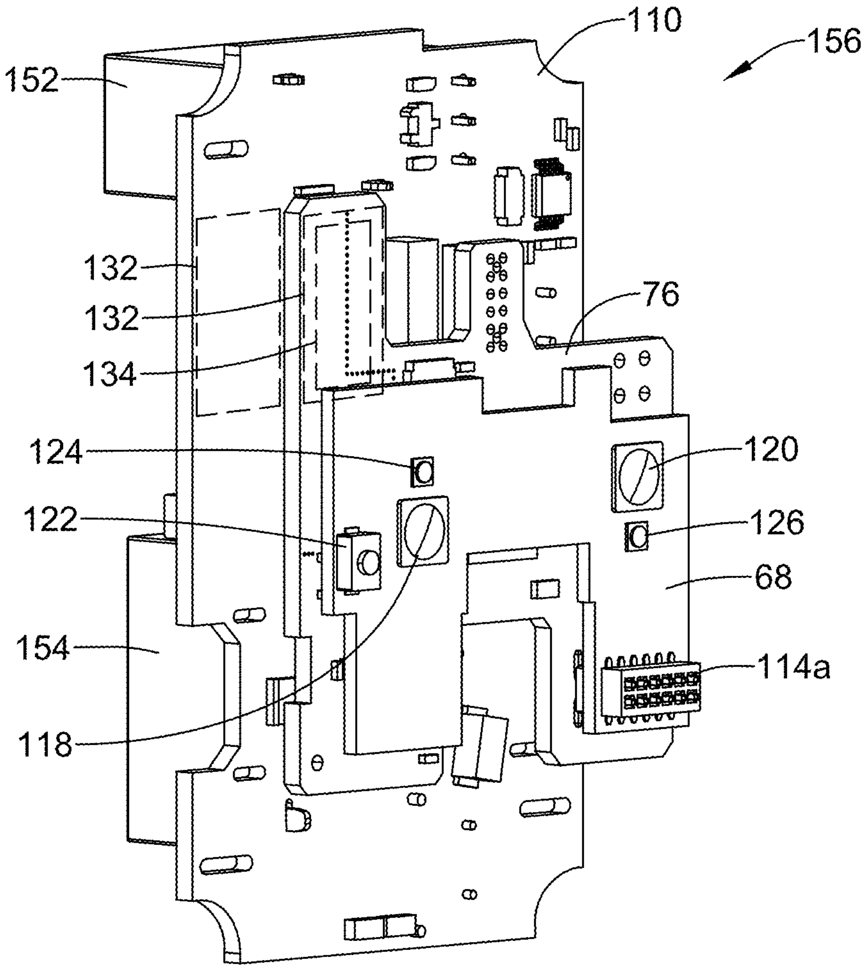
FIG. 12A is a front perspective view and FIG. 12B is a rear perspective view of the illustrative user interface PCB of FIGS. 7A and 7B, the illustrative communication PCB of FIGS. 9A and 9B, and the illustrative power switching PCB of FIGS. 11A and 11B, showing the relative arrangement of the three PCBS within the illustrative outlet socket of FIG. 4.
Figure 12B:
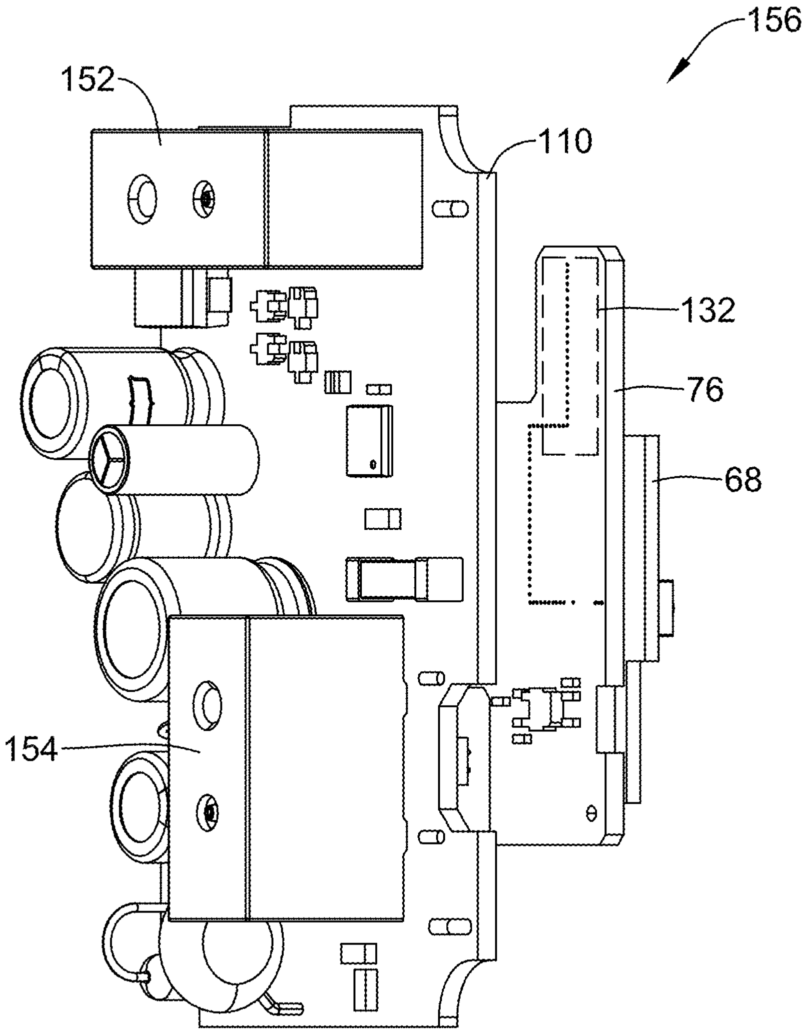

FIG. 12A is a front perspective view and FIG. 12B is a back perspective view of a PCB assembly 156 that includes the user interface PCB 68, the communication PCB 76 and the power switching PCB 110, showing how the user interface PCB 68, the communication PCB 76 and the power switching PCB 110 are spatially arranged with respect to each other within the outlet socket 10 (or 10*a*). FIGS. 12A and 12B show how the region 132 may be expanded (projected) frontwards and backwards onto each of the user interface PCB 68, the communication PCB 76 and the power switching PCB 110 to show how the antenna 134 is disposed within a packaged electronics-free zone. Further details regarding the antenna 134 will be discussed with respect to subsequent drawings.

Figure 13:
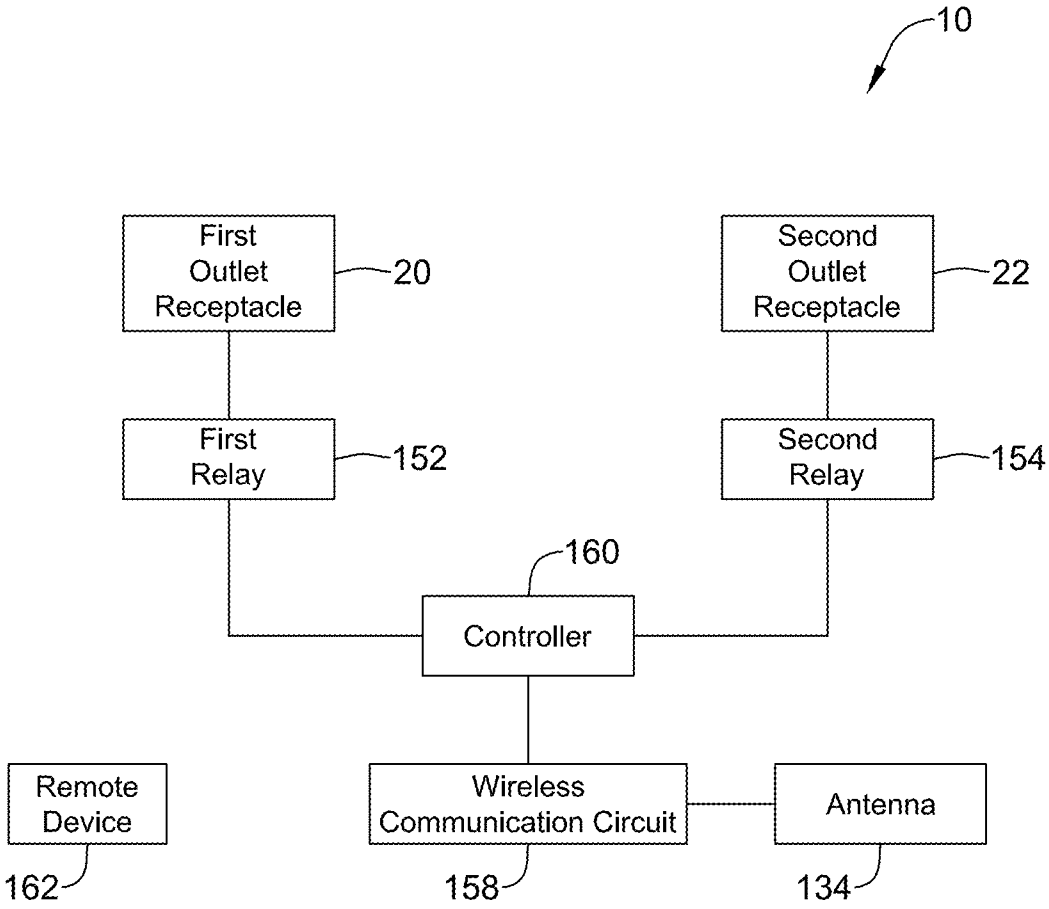
FIG. 13 is a schematic block diagram showing an illustrative outlet socket.

FIG. 13 is a schematic block diagram of the outlet socket 10 (or 10*a*). As can be seen, the outlet socket 10 (or 10*a*) includes a wireless communication circuit 158. A controller 160, which may be considered as being an example of the microcontroller 130, is operatively coupled to the first relay 152, the second relay 154 and the wireless communication circuit 158. The controller 160 is configured to communicate with one or more remote devices 162 via the wireless communication circuit 158 and the antenna 134. The controller 160 is also configured to control the state of the first relay 152 and the second relay 154. In some instances, the controller 160 may provide one or more control signals to the power switching PCB 110 via the second connector 128 to selectively turn power on and turn power off to the female outlet receptacles 20, 22. In some instances, the controller 160 may receive input signals from the user interface PCB 68 via the first connector 114 and uses the input signals to determine whether to turn power on and turn power off to the female outlet receptacles 20, 22. In some cases, the controller 160 may provide one or more control signals to the user interface PCB 68 via the first connector 114, and the user interface PCB 68 uses the one or more control signals from the communication PCB 76 to control at least one of the one or more user interface components 166. The user interface components 166 may include buttons such as the first button 36 and/or the second button 40, or LED indicators such as the first LED indicator 38 and/or the second LED indicator 42.

Figure 14:
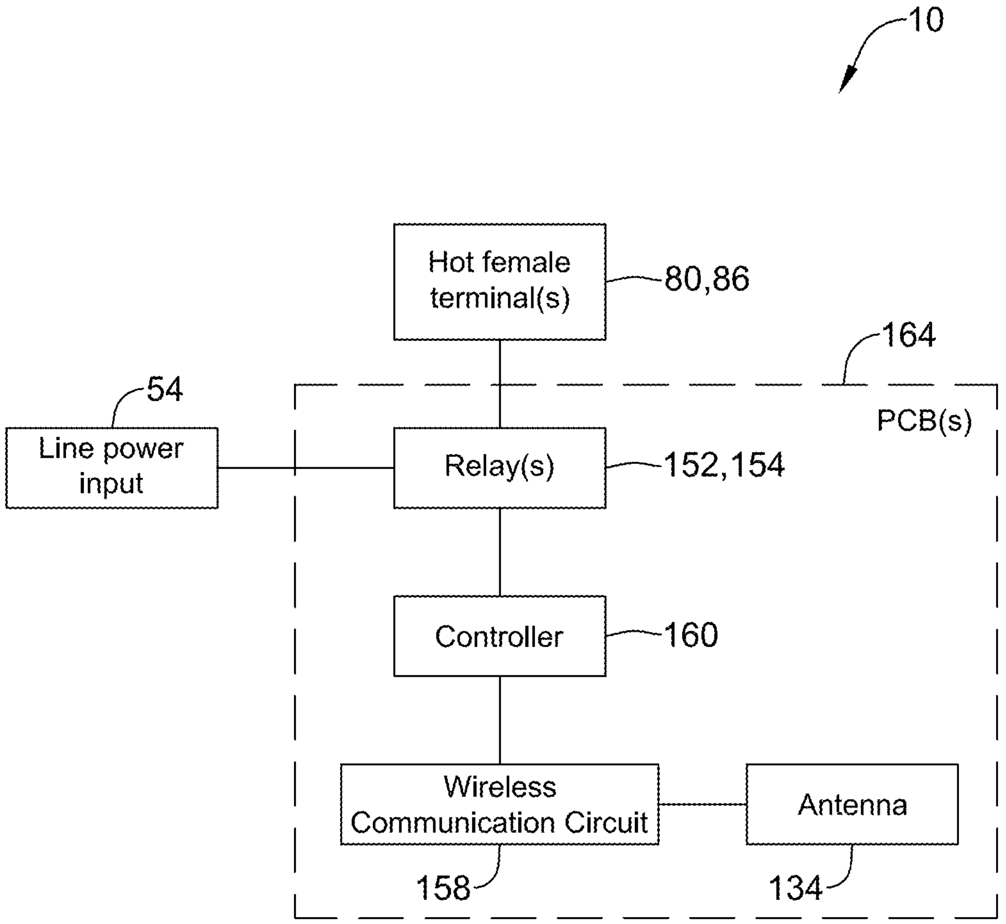
FIG. 14 is a schematic block diagram showing an illustrative outlet socket.

FIG. 14 is a schematic block diagram of the outlet socket 10 (or 10*a*). The outlet socket 10 (or 10*a*) includes one or more printed circuit boards 164 that includes several different components. The one or more printed circuit boards 164 may include one or more of the user interface PCB 68, the communication PCB 76 and/or the power switching PCB 110, for example. The one or more printed circuit boards 164 may include the relay(s) 152, 154 that electrically connect the hot female terminal(s) 80, 86 to the hot input 54 when the relay(s) 152, 154 are in a closed state and electrically disconnect the hot female terminals(s) 80, 86 from the hot input 54 when the relay(s) 152, 154 are in a closed state.

In some cases, the one or more printed circuit boards 164 may extend into the packaged electrical component-free zone indicated by the region 132 but are free from any packaged electrical component mounted to the one or more printed circuit boards 164 in the packaged electrical component-free zone. In some instances, any portion of the one or more printed circuit boards 164 that extend into the packaged electrical component-free zone do not have a ground plane extending into the packaged electrical component-free zone. The relay(s) 152 and 154 are mounted to the one or more printed circuit boards 164, but do not extend into the packaged electrical component-free zone. Each of the line voltage components that electrically connect to the hot female terminal(s) 80, 86, the neutral female terminals 82 and 88 and to the ground female terminals 84 and 90 are routed within the outlet socket 10 so as to avoid the packaged electrical component-free zone.

Figure 15:
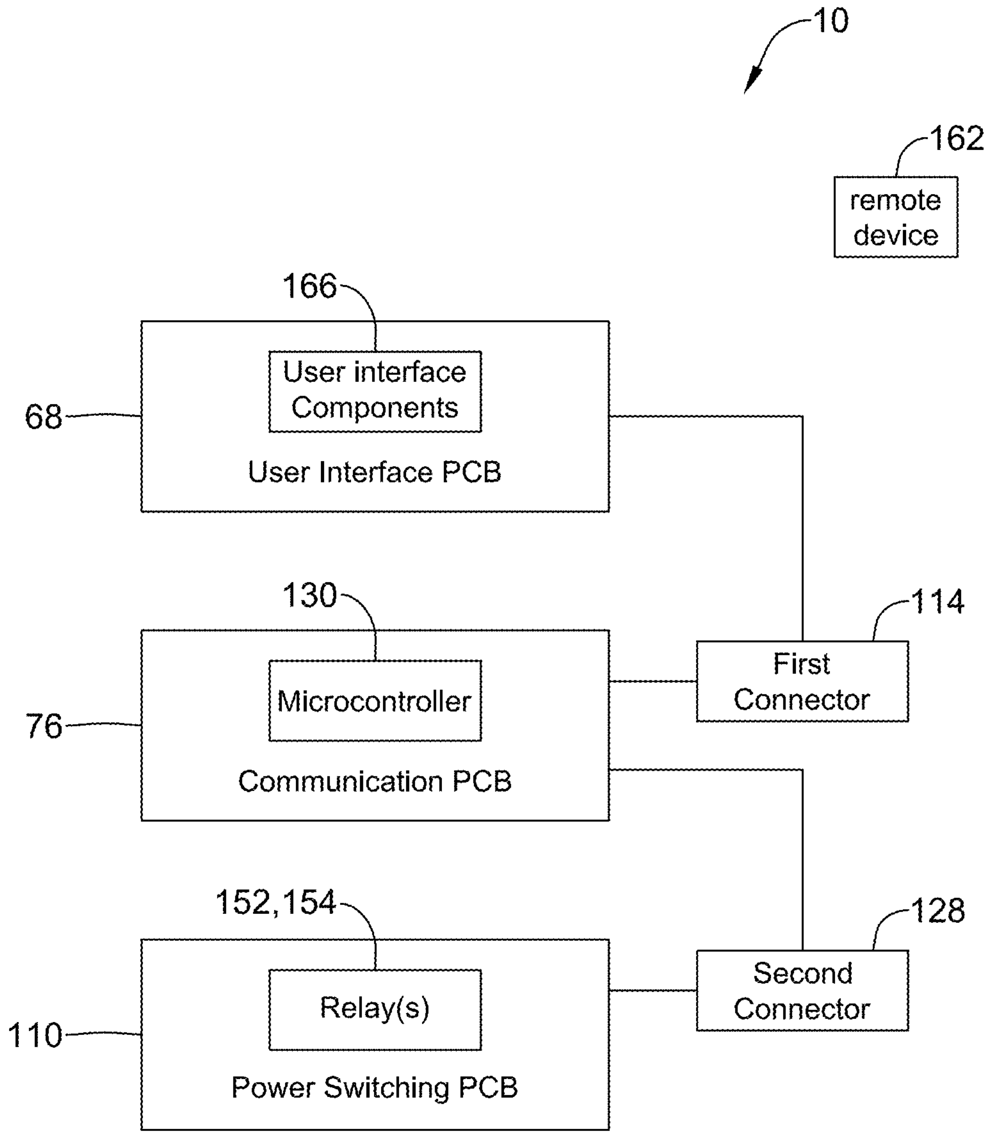
FIG. 15 is a schematic block diagram showing an illustrative outlet socket.

In some cases, the outlet socket 10 (and 10*a*) is configured to be able to be opened in the field in order to change the functionality of the outlet socket 10 (and 10*a*). FIG. 15 is a schematic view of the outlet socket 10 (or 10*a*) showing a number of stacked printed circuit boards including the user interface PCB 68, the communication PCB 76 and the power switching PCB 110. In some cases, the housing 14 (FIG. 1) may be releasably opened in the field (e.g. via screws), and one or more of the user interface PCB 68, the communication PCB 76 and the power switching PCB 110 may be swapped out with different boards having different functionality, and thus are configured to be replaceable in the field. For example, the user interface PCB 68 may be swapped out in order to change the user interface components 166. The communication PCB 76 may be swapped out in order to change from a communication PCB 76 that is configured to wirelessly communicate using a first wireless communications protocol (e.g. WiFi) to change to a replacement communication PCB 76 that is configured to wirelessly communicate via a second wireless communications protocol (e.g. Bluetooth) that is different from the first wireless communications protocol. The power switching PCB 110 may be swapped out for a replacement power switching PCB that does not include relays, for example, or to accommodate relays with a different power rating.

Figure 16:
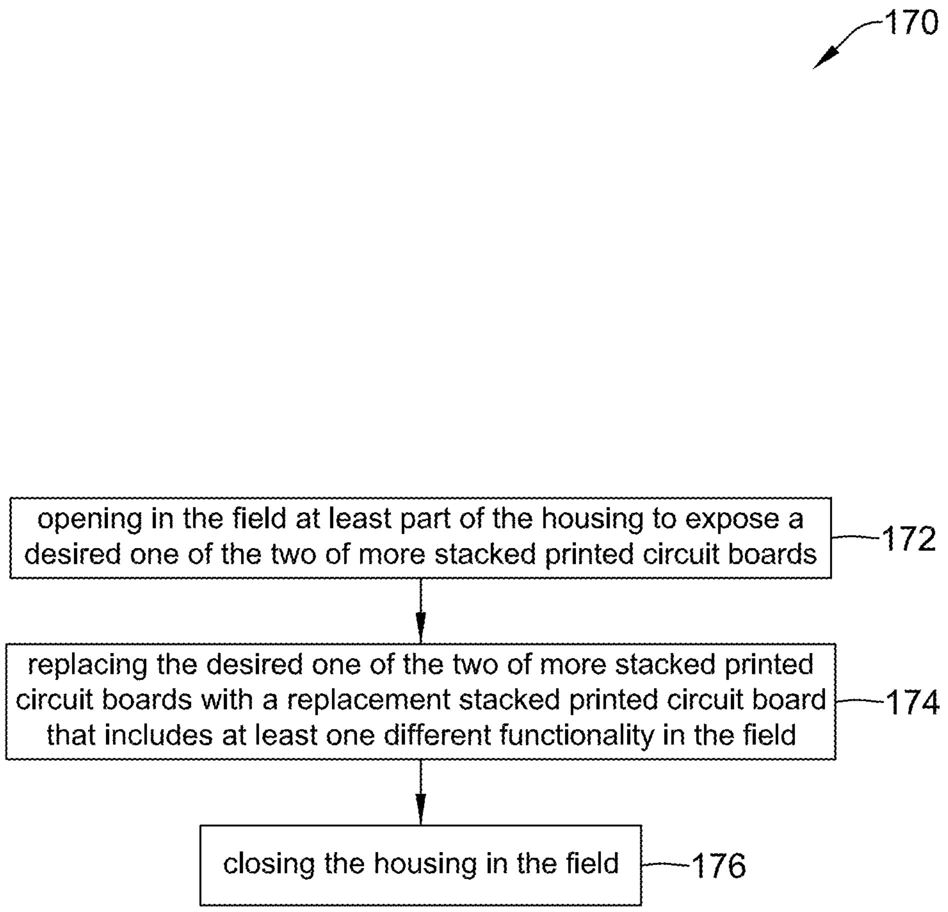
FIG. 16 is a flow diagram showing an illustrative method of changing the function of an outlet socket in the field.

FIG. 16 is a flow diagram showing an illustrative method 170 of changing a function of an outlet socket (such as the outlet socket 10 or 10*a*) in the field. The method 170 includes opening in the field at least part of the housing (such as the housing 14) to expose a desired one of the two of more stacked printed circuit boards (such as the user interface PCB 68, the communication PCB 76 and/or the power switching PCB 110), as indicated at block 172. In some instances, opening the housing 14 includes removing one or more removable screws or other fasteners. The desired one of the two of more stacked printed circuit boards is replaced in the field with a replacement stacked printed circuit board that includes at least one different functionality, as indicated at block 174. The housing is closed in the field, as indicated at block 176. In some cases, closing the housing in the field includes reinstalling the one or more screws or other fasteners.

In some instances, the desired one of the two of more stacked printed circuit boards selectively turns power on and power off to the female socket receptacle in accordance with a first maximum current load (e.g. 10 amperes), and the replacement stacked printed circuit board selectively turns power on and power off to the female socket receptacle in accordance with a second maximum current load (e.g. 20 amperes), wherein the second maximum current load is different from the first maximum current load. In some instances, one of the two or more stacked printed circuit boards interfaces with one or more user interface components, and the method includes replacing one or more user interface components with one or more replacement user interface components, where the desired one of the two of more stacked printed circuit boards interfaces with the one or more user interface components, and the replacement stacked printed circuit board interfaces with the one or more replacement user interface components.

Figure 17:
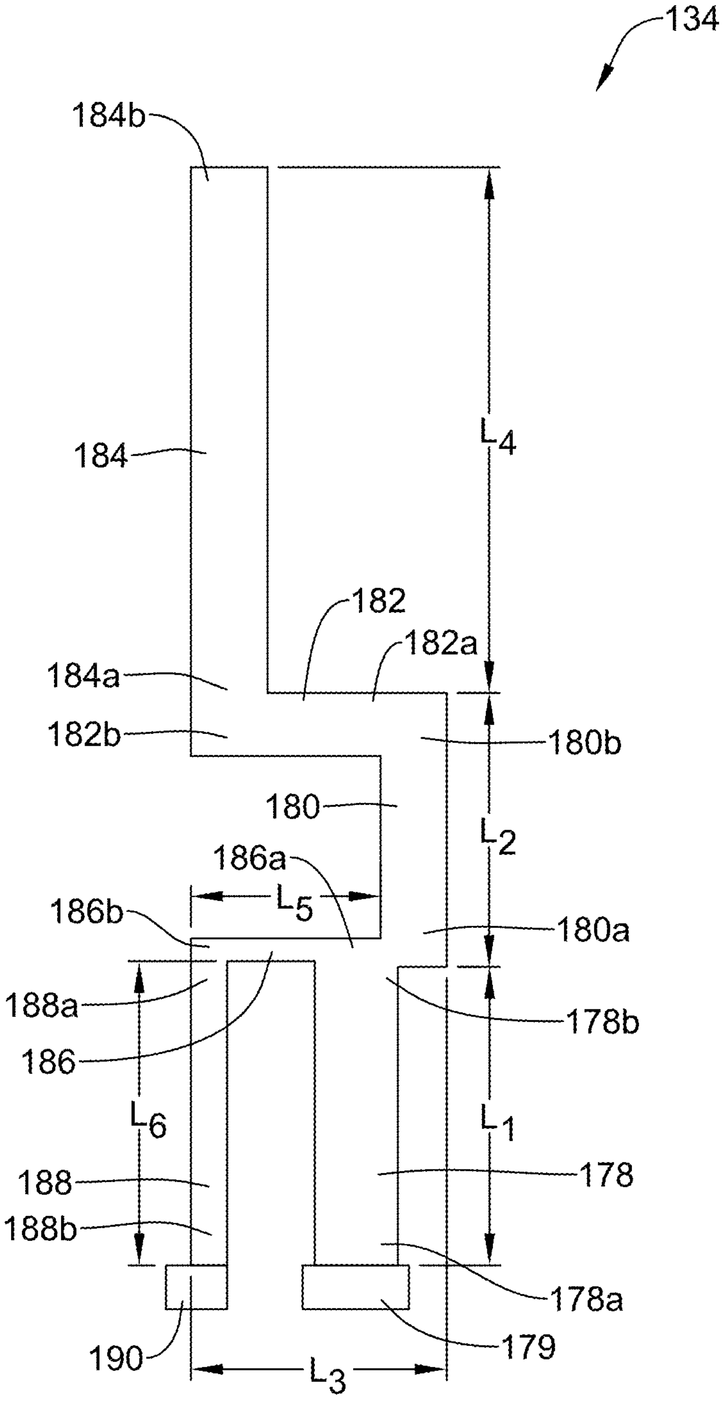
FIG. 17 is a schematic view of an illustrative antenna forming part of the illustrative outlet socket of FIG. 4, the illustrative antenna configured to be disposed on the illustrative communication PCB of FIGS. 9A and 9B within a packaged electrical component-free zone extending both behind and in front of the illustrative antenna.

FIG. 17 is a schematic view of the antenna 134. In some instances, the antenna 134 may be considered as being a printed circuit board-implemented antenna in which the antenna 134 is formed from conductive traces on a printed circuit board. In some cases, the antenna 134 may be formed on or within one of the plurality of printed circuit boards 164. In some instances, the antenna 134 may be formed on the communication PCB 76, for example. In some cases, the antenna 134 may be tuned for use with a particular frequency. As an example, the antenna 134 may be tuned for use with a frequency of about 2.4 GHz, which corresponds to Bluetooth. In some cases, the antenna 134 may have a return loss of less then −10 dB at 2.4 GHz. In some cases, the antenna 134 may have a return loss of less then −10 dB across the frequency range of 2.1 GHz-2.6 GHz. The antenna 134 may be positioned within the outlet socket 10 (and 10*a*) such that the antenna 134 is laterally offset from the ground bracket 58.

The illustrative antenna 134 includes a first antenna leg 178 supported by a printed circuit board, the first antenna leg 178 having a length $L_1$ and a width orthogonal to the length $L_1$. A first end region 178*a* of the first antenna leg 178 is operatively connected to an antenna signal trace 179 of the printed circuit board, and a second end region 178*b* of the first antenna leg 178 extends away from the first end region 178*a* of the first antenna leg 178 in a first direction. The antenna 134 includes a second antenna leg 180 supported by the printed circuit board, the second antenna leg 180 having a length $L_2$ and a width orthogonal to the length $L_2$. A first end region 180*a* of the second antenna leg 180 is connected to the second end region 178*b* of the first antenna leg 178, and a second end region 180*b* of the second antenna leg 180 extends away from the first end region 180*a* of the second antenna leg 180 in the first direction, wherein a centerline along the length of the second antenna leg 180 is laterally offset from a centerline along the length of the first antenna leg 178. The antenna 134 includes a third antenna leg 182 supported by the printed circuit board, the third antenna leg 182 having a length $L_3$ and a width orthogonal to the length $L_3$. A first end region 182*a* of the third antenna leg 182 is connected to the second end region 180*b* of the second antenna leg 180, and a second end region 182*b* of the third antenna leg 182 extends away from the first end region 182*a* of the third antenna leg 182 in a second direction that is orthogonal to the first direction. The antenna 134 includes a fourth antenna leg 184 supported by the printed circuit board, the fourth antenna leg 184 having a length $L_4$ and a width orthogonal to the length $L_4$. A first end region 184*a* of the fourth antenna leg 184 is connected to the second end region 182*b* of the third antenna leg 182, and a second end region 184*b* of the fourth antenna leg 184 extends away from the first end region 184*a* of the fourth antenna leg 184 in the first direction. The antenna 134 includes a fifth antenna leg 186 supported by the printed circuit board, the fifth antenna leg having a length $L_5$ and a width orthogonal to the length $L_5$. A first end region 186*a* of the fifth antenna leg 186 is connected to the second end region 178*b* of the first antenna leg 178, and a second end region 186*b* of the fifth antenna leg 186 extends away from the first end region 186*a* of the fifth antenna leg 186 in the second direction that is orthogonal to the first direction. The antenna 134 includes a sixth antenna leg 188 supported by the printed circuit board, the sixth antenna leg 188 having a length $L_6$ and a width orthogonal to the length $L_6$. A first end region 188*a* of the sixth antenna leg 188 is connected to the second end region 186*b* of the fifth antenna leg 186, and a second end region 188*b* of the sixth antenna leg 188 extending away from the first end region 188*a* of the sixth antenna leg 188 in a direction opposite to the first direction and operatively connected to a ground plane 190 of the printed circuit board.

In some instances, the length $L_2$ of the second antenna leg 180 may be shorter than the length $L_1$ of the first antenna leg 178. In some instances, the length $L_4$ of the fourth antenna leg 184 may be longer than the lengths $L_1$, $L_2$, $L_3$, respectively, of each of the first antenna leg 178, the second antenna leg 180 and the third antenna leg 182. In some cases, the width of the second antenna leg may be less than the width of the first antenna leg 178. In some cases, the width of the sixth antenna leg 188 may be less than the width of each of the first antenna leg 178, the second antenna leg 180, the third antenna leg 182 and the fourth antenna leg 184.

In some instances, the first antenna leg 178 may have a length $L_1$ that is about 5 millimeters and a width of about 1.25 millimeters. The term "about" may refer to a dimension being within plus/minus 20 percent. As an example, the first antenna leg 178 may have a length $L_1$ that ranges from 4 millimeters to 6 millimeters, and a width that ranges from 1 millimeter to 1.5 millimeters. The second antenna leg 180 may have a length $L_2$ of about 4 millimeters and a width of about 1 millimeter. The third antenna leg 182 may have a length $L_3$ of about 2 millimeters and a width of about 1 millimeter. The fourth antenna leg 184 may have a length $L_4$ of about 10 millimeters and a width of about 1 millimeter. The fifth antenna leg 186 may have a length $L_5$ of about 4 millimeters and a width of about 0.4 millimeter. The sixth antenna leg 188 may have a length $L_6$ of about 5 millimeters and a width of about 0.4 millimeter. These are just examples.

In some cases, the antenna 134, including the first antenna leg 178, the second antenna leg 180, the third antenna leg 182, the fourth antenna leg 184, the fifth antenna leg 186 and the sixth antenna leg 188, may collectively fit within a rectangular area on the printed circuit board of less than 80 square millimeters. As an example, the antenna 134 may fit within a rectangular area that is about 20 millimeters by about 4 millimeters. In some cases, the rectangular area of the printed circuit board that the antenna 134, including the first antenna leg 178, the second antenna leg 180, the third antenna leg 182, the fourth antenna leg 184, the fifth antenna leg 186 and the sixth antenna leg 188, fits into may be free from a ground plane. In some instances, the first antenna leg 178, the second antenna leg 180, the third antenna leg 182, the fourth antenna leg 184, the fifth antenna leg 186 and the sixth antenna leg 188 may each be formed from metal traces of the printed circuit board. In some cases, the metal traces forming the legs of the antenna may be formed on a single metal layer of the printed circuit board. In some cases, the metal traces forming the legs of the antenna may be formed on two or more metal layers of the printed circuit board interconnected by one or more VIAS.

In some instances, the antenna 134 may be considered as including a plurality of antenna legs that are each formed using one or more metal layers of the printed circuit board. The plurality of antenna legs may include two parallel extending antenna segments supported by the printed circuit board (e.g. the first antenna leg 178 and the sixth antenna leg 188). The ends of the two parallel extending antenna segments are operatively connected via an interconnecting segment (the fifth antenna leg 186). The plurality of antenna legs include an antenna tail that is operatively coupled to the interconnecting segment (the fifth antenna leg 186), wherein the tail has an overall length that is at least twice as long as the first one of the two parallel extending antenna segments and at least twice as long as the second one of the two parallel extending antenna segments. In the example of FIG. 17, the antenna tail encompasses the second antenna leg 180, the third antenna leg 182 and the fourth antenna leg 184.

Figure 18A:
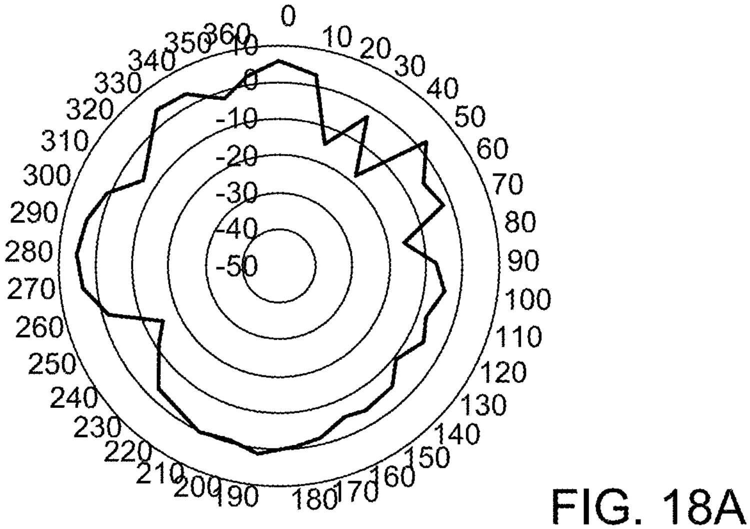
FIGS. 18A and 18B are graphs providing simulated effective received power values with calibration factor and constant elevation (FIG. 18A) and constant azimuth (FIG. 18B)
Figure 18B:
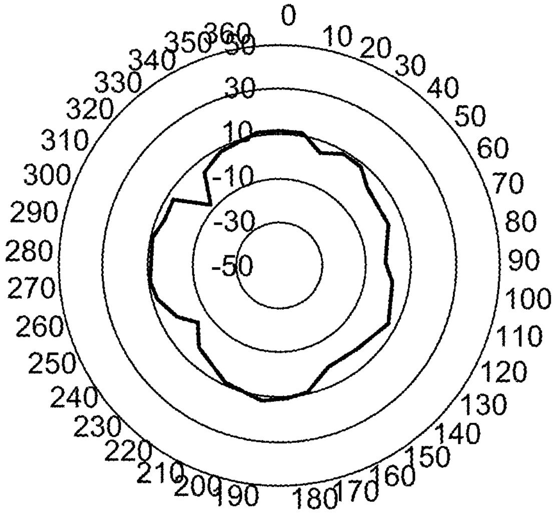

FIGS. 18A and 18B are graphs providing simulated effective received power values with calibration factor and constant elevation (FIG. 18A) and constant azimuth (FIG. 18B) for the antenna 134. FIGS. 18A and 18B both illustrate good performance for the antenna 134 at all angles.

Figure 19:
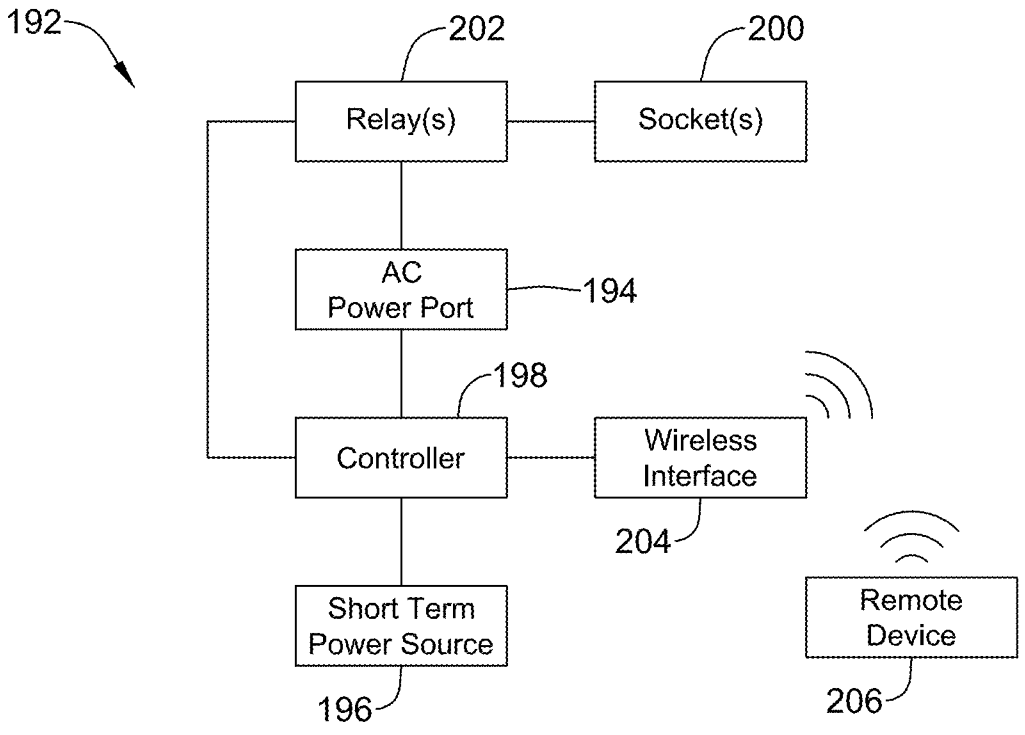
FIG. 19 is a schematic block diagram showing an illustrative circuit forming part of the illustrative outlet sockets described herein.

FIG. 19 is a schematic block diagram showing an illustrative circuit 192 that may be incorporated into the outlet socket 10 (or 10*a*) for monitoring for power losses within the power supply to the outlet socket 10. The circuit 192 may be incorporated into one of the one or more printed circuit boards 164, for example. The circuit 192 includes an AC power port 194 for receiving AC power to power the circuit 192. The AC power may have an expected amplitude, expected frequency and an expected period of 1/frequency. For example, the AC power may have an expected amplitude of 120 Volts, an expected frequency of 60 Hertz and expected period of 16 milliseconds. In another example, the AC power may have an expected amplitude of 220 Volts, an expected frequency of 50 Hertz and expected period of 20 milliseconds. The circuit 192 includes a short-term power source 196 for maintaining power to the circuit 192 for a shutdown period of time following a loss of AC power. As an example, the short-term power source 196 may be a capacitor, battery and/or other short-term power supply. A controller 198 is operatively coupled to the AC power port 194 and the short-term power source 196. In some cases, the circuit 192 may also include one or more sockets 200 to plug in one or more components, one or more relays 202 for controlling AC power to the one or more sockets 200, and a wireless interface 204 for communicating wireless messages with a remote device 206.

The controller 198 is configured to detect zero-crossings of the AC power (i.e. amplitude of the voltage of the AC power) at the AC power port 194 and to determine a zero-crossing count of zero-crossings that are detected over a count period of time, wherein the count period of time has a duration that covers a multiple “n” of the expected period of the AC power, where “n” is a positive integer. In some cased, the multiple “n” may be programmable, and may be greater 1. In some cases, the multiple “n” may be made larger when the short-term power supply of the outlet socket 10 is larger thereby providing a longer shutdown period of time following a loss of AC power. A larger value of “n” may reduce AC power loss false detections relative to using a smaller value of “n”.

The controller 198 is configured to determine when the zero-crossing count is less than an expected zero-crossing count over the count period of time, wherein the expected zero-crossing count corresponds to a number of zero-crossings that are expected to occur over the count period of time assuming the AC power is not lost. In some cases, the controller 198 may be configured to detect just positive (or negative) zero-crossings, and the expected zero-crossing count may correspond to the number of positive (or negative) zero-crossings that are expected to occur over the count period of time assuming the AC power is not lost. In some cases, the controller 198 may be configured to detect both positive and negative zero-crossings, and the expected zero-crossing count may correspond to the number of positive and negative zero-crossings that are expected to occur over the count period of time assuming the AC power is not lost.

When the zero-crossing count is less than the expected zero-crossing count over the count period of time, the controller 198 is configured to compare the amplitude of the AC power to the expected amplitude (i.e. the expected amplitude of the voltage of the AC power). When the amplitude of the AC power is less than the expected amplitude by at least a threshold margin (e.g. amplitude of the AC power is less than 80% of the expected amplitude), the controller 198 is configured to perform one or more shut down actions during the shutdown period of time to prepare the circuit 192 for loss of AC power. The one or more shut down actions may include one or more of saving the current state, settings and/or operating parameters of the circuit 192 to a non-volatile memory, sending an alarm to the remote device 206 via the wireless interface 204, and closing and/or opening the one or more relays 202. When the amplitude of the AC power is not less than the expected amplitude by at least the threshold margin (e.g. amplitude of the AC power is less than 80% of the expected amplitude), the controller 198 is configured to reset the zero-crossing count to zero. When the zero-crossing count is not less than the expected zero-crossing count over the count period of time, the controller 198 is configured to reset the zero-crossing count to zero.

Figure 20:
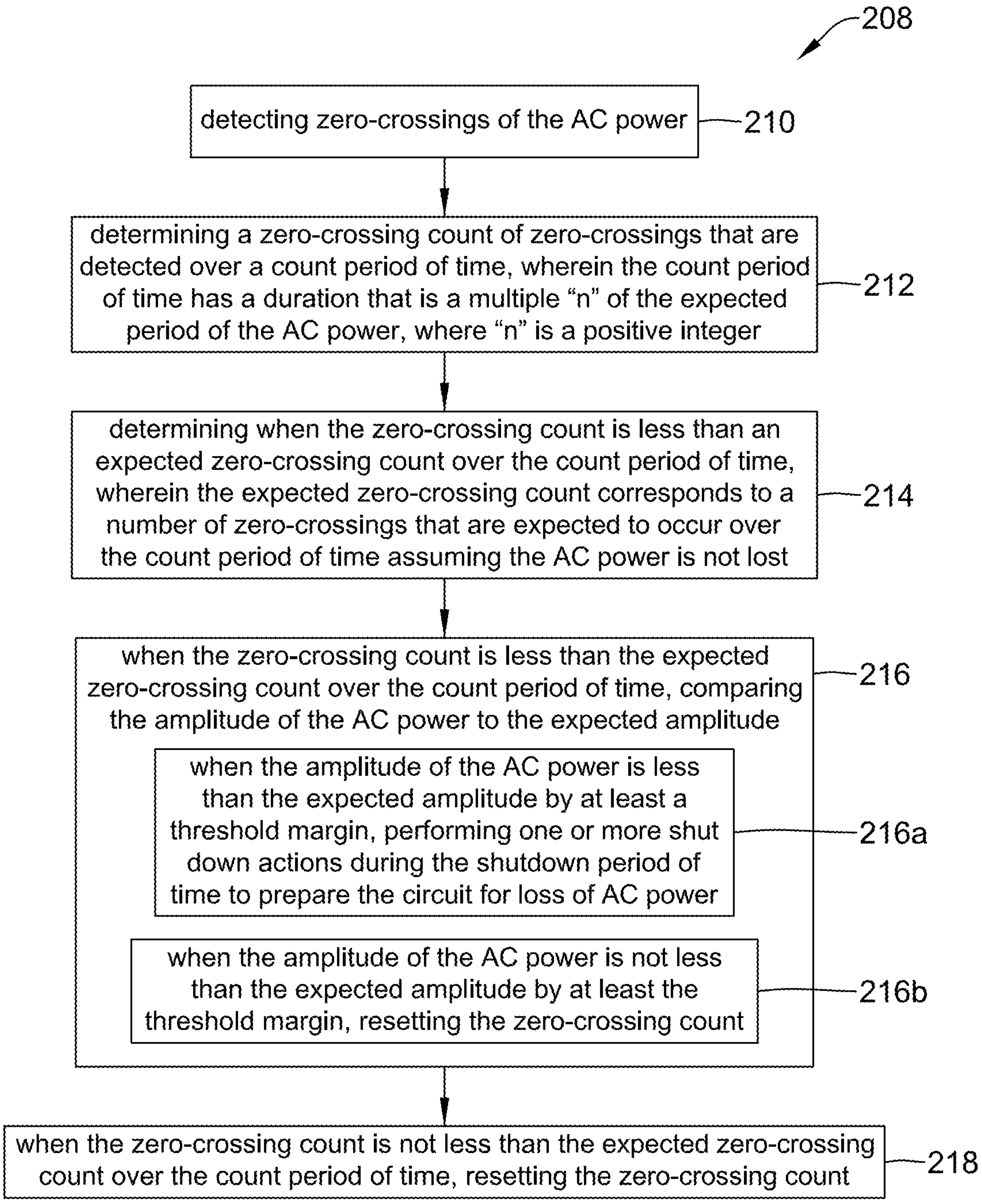
FIG. 20 is a flow diagram showing an illustrative method of detecting power loss in the illustrative circuit of FIG. 19.

FIG. 20 is a flow diagram showing an illustrative method 208 for detecting a power loss of AC power to a circuit (such as the circuit 192), wherein the circuit includes a short-term power source (such as the short-term power source 196) for maintaining power to the circuit for a shutdown period of time following the power loss of AC power, the AC power having an expected amplitude, expected frequency and an expected period of 1/frequency. The method includes detecting zero-crossings of the AC power, as indicated at block 210. In some cases, this includes detecting both positive and negative zero-crossings. In some cases, this includes detecting just positive or negative zero-crossings. A determination is made as to a zero-crossing count of zero-crossings that are detected over a count period of time, wherein the count period of time has a duration that covers a multiple “n” of the expected period of the AC power, where “n” is a positive integer, as indicated at block 212. In some instances, the count period of time may be offset so as to begin between two successive expected zero-crossings of the AC power assuming the power was not lost. As an example, the multiple “n” may be programmable, and may be greater 1. In some cases, the multiple “n” may be made larger when the short-term power supply (e.g. short-term power source 196) of the circuit (e.g. circuit 192) is larger thereby providing a longer shutdown period of time following a loss of AC power. A larger value of “n” may reduce AC power loss false detections relative to using a smaller value of “n”.

A determination is made as to when the zero-crossing count is less than an expected zero-crossing count over the count period of time, wherein the expected zero-crossing count corresponds to a number of zero-crossings that are expected to occur over the count period of time assuming the AC power is not lost, as indicated at block 214. In some cases, the expected zero-crossing count may correspond to the number of positive (or negative) zero-crossings that are expected to occur over the count period of time assuming the AC power is not lost. In some cases, the expected zero-crossing count may correspond to the number of positive and negative zero-crossings that are expected to occur over the count period of time assuming the AC power is not lost.

When the zero-crossing count is less than the expected zero-crossing count over the count period of time (sometimes by threshold margin), the amplitude of the AC power (e.g. the amplitude of the voltage of the AC power) is compared to the expected amplitude of the AC power, as indicated at block 216. Moreover, when the amplitude of the AC power is less than the expected amplitude by at least a threshold margin, one or more shut down actions are performed during the shutdown period of time to prepare the circuit for loss of AC power, as indicated at block 216*a*. The one or more shut down actions may include one or more of saving the current state, settings and/or operating parameters of the circuit to a non-volatile memory, sending an alarm, and closing and/or opening one or more relays. Moreover, when the amplitude of the AC power is not less than the expected amplitude by at least the threshold margin, the zero-crossing count is reset to zero, as indicated at block 216*b*.

When the zero-crossing count is not less than the expected zero-crossing count over the count period of time, the zero-crossing count is reset to zero, as indicated at block 218. In some instances, detecting zero-crossings of the AC power may include issuing a zero-crossing interrupt for each detected zero-crossing, and determining the zero-crossing count of the zero-crossings that are detected over the count period of time may include counting the zero-crossing interrupts that are issued over the count period of time. In some cases, the method 208 may include issuing count period interrupts at a period that corresponds to the multiple "n" of the expected period of the AC power, wherein the count period of time is defined between two successive count period interrupts. In some cases, the interrupts are generated by Energy Management Device HLW8112 commercially available from HiLiwi technology.

Figure 21:
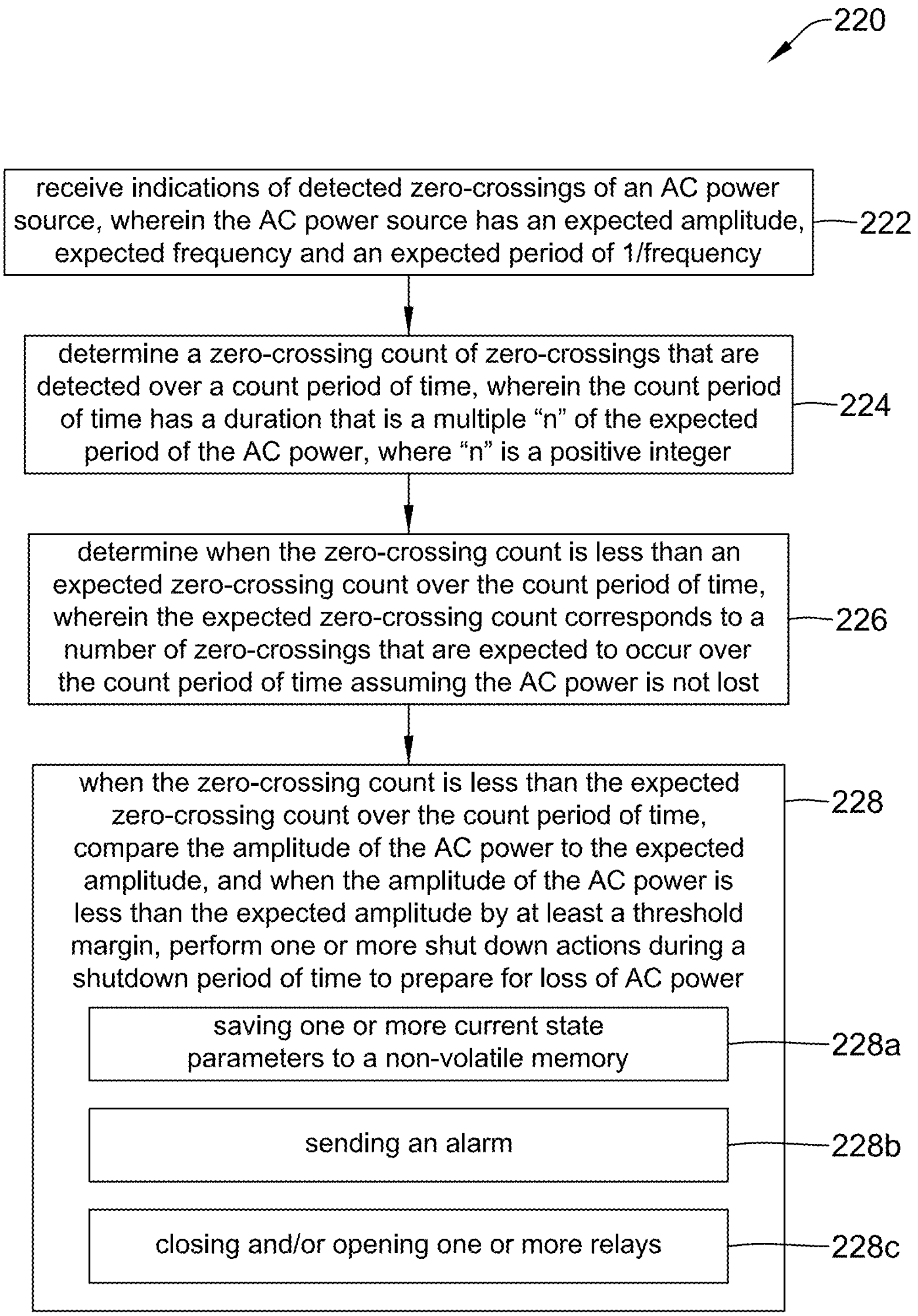
FIG. 21 is a flow diagram showing an illustrative series of steps that may be carried out by one or more processors executing executable instructions.

FIG. 21 is a flow diagram showing an illustrative series of steps 220 that may be carried out by one or more processors executing executable instructions. The one or more processors may be part of a controller (e.g. controller 198), for example. The one or more processors may be caused to receive indications of detected zero-crossings of an AC power source, wherein the AC power source has an expected amplitude, expected frequency and an expected period of 1/frequency, as indicated at block 222. The indications of detected zero-crossings of the AC power source may be provided by Energy Management Device HLW8112 commercially available from HiLiwi technology or any other suitable circuit or device. The one or more processors may be caused to determine a zero-crossing count of zero-crossings that are detected over a count period of time, wherein the count period of time has a duration that covers a multiple "n" of the expected period of the AC power, where "n" is a positive integer, as indicated at block 224. In some cased, the multiple "n" may be programmable.

The one or more processors may be caused to determine when the zero-crossing count is less than an expected zero-crossing count over the count period of time, wherein the expected zero-crossing count corresponds to a number of zero-crossings that are expected to occur over the count period of time assuming the AC power is not lost, as indicated at block 226. When the zero-crossing count is less than the expected zero-crossing count over the count period of time, the one or more processors may be caused to compare the amplitude of the AC power to the expected amplitude, and when the amplitude of the AC power is less than the expected amplitude by at least a threshold margin, the one or more processors may be caused to perform one or more shut down actions during a shutdown period of time to prepare for loss of AC power, as indicated at block 228. The one or more shutdown actions may include saving the state, settings and/or operating parameters to a non-volatile memory, as indicated at block 228*a*. The one or more shutdown actions may include sending an alarm, as indicated at block 228*b*. The one or more shutdown actions may include closing and/or opening one or more relays, as indicated at block 228*c*. When the amplitude of the AC power is not less than the expected amplitude by at least the threshold margin, the one or more processors may be caused to reset the zero-crossing count to zero. When the zero-crossing count is not less than the expected zero-crossing count over the count period of time, the one or more processors may be caused to reset the zero-crossing count to zero.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. An outlet socket, comprising:
- a first socket receptacle for receiving a first power plug;
- a second socket receptacle for receiving a second power plug;
- a first relay for supplying power to the first power plug when the first relay is in a closed state and for not supplying power to the first power plug when the first relay is in an open state;
- a second relay for supplying power to the second power plug when the second relay is in the closed state and for not supplying power to the second power plug when the second relay is in the open state;
- a wireless communication circuit;
- an antenna operative connected to the wireless communication circuit;
- a controller operatively coupled to the first relay, the second relay and the wireless communication circuit, the controller configured to:
  - communicate with one or more remote devices via the wireless communication circuit and the antenna;
  - control the state of the first relay and the second relay; and
- a packaged electrical component free zone extending from the antenna to a front of the outlet socket and from the antenna to a back of the outlet socket, wherein the packaged component free zone is free from packaged electrical components including the first relay and the second relay.

2. The outlet socket of claim 1, wherein the packaged electrical components include resistors, capacitors and inductors.

3. The outlet socket of claim 1, wherein the packaged electrical components include relays, transistors and microcontrollers.

4. The outlet socket of claim 1, wherein the packaged electrical component free zone extends laterally of the antenna by at least 1 millimeter on each of at least three sides of the antenna.

5. An outlet socket for supplying power to a removable power plug, comprising:
- a housing having a front and a back, with the front having a female hot port, a female neutral port and a female ground port for receiving a male hot conductor, a male neutral conductor and a male ground conductor, respectively, of the removable power plug;

a hot female terminal housed by the housing for electrically connecting to the male hot conductor when the male hot conductor is inserted through the female hot port of the housing;

a neutral female terminal housed by the housing for electrically connecting to the male neutral conductor when the male neutral conductor is inserted through the female neutral port of the housing;

a ground female terminal housed by the housing for electrically connecting to the male ground conductor when the male ground conductor is inserted through the female ground port of the housing;

a line power input for connecting to a line wire;

a neutral input for connecting to neutral wire, the neutral female terminal electrically connected to the neutral input;

a ground input for connecting to a ground wire, the ground female terminal electrically connected to the ground input;

a conductive ground bracket electrically connected to the ground female terminal and extending laterally across the housing from a first side of the housing to a second opposing side of the housing, the conductive ground bracket including a first mounting plate on the first side of the housing and a second mounting plate on the second side of the housing for mounting the outlet socket;

one or more printed circuit boards housed by the housing, the one or more printed circuit boards including:

a relay that electrically connects the hot female terminal to the line power input when the relay is in a closed state and electrically disconnects the hot female terminal from the line power input when the relay is in an open state;

a wireless communication circuit;

an antenna operative connected to the wireless communication circuit, the antenna is laterally offset from the conductive ground bracket;

a controller operatively coupled to the relay and the wireless communication circuit, the controller configured to:

communicate with one or more remote devices via the wireless communication circuit and the antenna;

control the state of the relay; and a packaged electrical component free zone extending from the antenna to the front of the housing and from the antenna to the back of the housing, wherein the packaged component free zone is free from packaged electrical components.

6. The outlet socket of claim 5, wherein the packaged electrical components include resistors, capacitors and inductors.

7. The outlet socket of claim 5, wherein the packaged electrical components include relays, transistors and microcontrollers.

8. The outlet socket of claim 5, wherein the packaged electrical component free zone extends laterally of the antenna by at least 1 millimeter on each of at least three sides of the antenna.

9. The outlet socket of claim 5, wherein one or more printed circuit boards extends into the packaged electrical component free zone but is free from any packaged electrical component mounted to the one or more printed circuit boards in the packaged electrical component free zone.

10. The outlet socket of claim 5, wherein the relay is mounted to one of the one or more printed circuit boards and does not extend into the packaged electrical component free zone.

11. The outlet socket of claim 5, further comprising one or more metallic connecting components that electrically connect to the hot female terminal, the neutral female terminal and the ground female terminal, wherein the one or more metallic connecting components are routed to avoid the packaged electrical component free zone.

12. The outlet socket of claim 5, wherein one or more of the printed circuit boards extend into the packaged electrical component free zone, but the one or more of the printed circuit boards that extend into the packaged electrical component free zone do not have any packaged electrical components mounted to the corresponding printed circuit board in the packaged electrical component free zone.

13. The outlet socket of claim 12, wherein the one or more of the printed circuit boards that extend into the packaged electrical component free zone do not have a ground plane that extends into the packaged electrical component free zone.

14. An outlet socket for supplying power to a removable power plug, comprising:

a housing having a front and a back, with the front having a female hot port, a female neutral port and a female ground port for receiving a male hot conductor, a male neutral conductor and a male ground conductor, respectively, of the removable power plug;

a hot female terminal housed by the housing for electrically connecting to the male hot conductor when the male hot conductor is inserted through the female hot port of the housing;

a neutral female terminal housed by the housing for electrically connecting to the male neutral conductor when the male neutral conductor is inserted through the female neutral port of the housing;

a ground female terminal housed by the housing for electrically connecting to the male ground conductor when the male ground conductor is inserted through the female ground port of the housing;

a line power input for connecting to a line wire;

a neutral input for connecting to neutral wire, the neutral female terminal electrically connected to the neutral input;

a ground input for connecting to a ground wire, the ground female terminal electrically connected to the ground input;

a conductive ground bracket electrically connected to the ground female terminal and extending laterally across the housing from a first side of the housing to a second opposing side of the housing, the conductive ground bracket including a first mounting plate on the first side of the housing and a second mounting plate on the second side of the housing for mounting the outlet socket;

one or more printed circuit boards housed by the housing, the one or more printed circuit boards including:

a relay that electrically connects the hot female terminal to the line power input when the relay is in a closed state and electrically disconnects the hot female terminal from the line power input when the relay is in an open state;

a wireless communication circuit;

a printed circuit board implemented antenna operative connected to the wireless communication circuit, wherein the printed circuit board implemented antenna includes one or more conductive traces of one of the one or more printed circuit boards, wherein the printed circuit board implemented antenna is laterally offset from the conductive ground bracket;

a controller operatively coupled to the relay and the wireless communication circuit, the controller configured to:

communicate with one or more remote devices via the wireless communication circuit and the printed circuit board implemented antenna;

control the state of the relay; and a conductive component free zone extending from the printed circuit board implemented antenna to the front of the housing and from the printed circuit board implemented antenna to the back of the housing, wherein the conductive component free zone is free from conductive components that would interfere with the range of the printed circuit board implemented antenna in one or more directions.

15. The outlet socket of claim 14, wherein the conductive components include resistors, capacitors and inductors.

16. The outlet socket of claim 14, wherein the conductive components include conductive traces of one or more of the one or more printed circuit boards.

17. The outlet socket of claim 14, wherein the conductive components include a ground plane of one or more of the one or more printed circuit boards.

18. The outlet socket of claim 14, wherein the conductive components include relays, transistors and microcontrollers.

19. The outlet socket of claim 14, wherein the conductive components include connecting components that electrically connect to the hot female terminal, the neutral female terminal and the ground female terminal.

20. The outlet socket of claim 14, wherein the conductive component free zone extends laterally of the printed circuit board implemented antenna by at least 1 millimeter on each of at least three sides of the printed circuit board implemented antenna.

* * * * *